United States Patent
Ardes

(10) Patent No.: US 9,731,232 B2
(45) Date of Patent: Aug. 15, 2017

(54) LIQUID FILTER HAVING A DRAINAGE VALVE

(75) Inventor: Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 666 days.

(21) Appl. No.: 14/237,825

(22) PCT Filed: Jun. 14, 2012

(86) PCT No.: PCT/EP2012/061247
§ 371 (c)(1),
(2), (4) Date: Feb. 7, 2014

(87) PCT Pub. No.: WO2013/020742
PCT Pub. Date: Feb. 14, 2013

(65) Prior Publication Data
US 2014/0190881 A1     Jul. 10, 2014

(30) Foreign Application Priority Data

Aug. 8, 2011    (DE) ........................ 10 2011 080 617

(51) Int. Cl.
*B01D 35/147*    (2006.01)
*B01D 35/153*    (2006.01)
*B01D 35/16*    (2006.01)

(52) U.S. Cl.
CPC ......... *B01D 35/147* (2013.01); *B01D 35/153* (2013.01); *B01D 35/16* (2013.01);
(Continued)

(58) Field of Classification Search
None
See application file for complete search history.

(56) References Cited

U.S. PATENT DOCUMENTS

| 6,569,326 B1* | 5/2003 | Baumann | ............... B01D 29/21 210/232 |
| 6,685,829 B1* | 2/2004 | Baumann | ............... B01D 29/21 210/130 |

(Continued)

FOREIGN PATENT DOCUMENTS

| DE | 10038531 | 8/2000 |
| DE | 202007006385 | 9/2007 |

OTHER PUBLICATIONS

International Search Report, Sep. 4, 2012.

*Primary Examiner* — Benjamin Kurtz
(74) *Attorney, Agent, or Firm* — Greer, Burns & Crain, Ltd.

(57) ABSTRACT

A liquid filter having a housing and a hollow insert. The housing has a dirty liquid feed, a clean liquid outlet and a drainage channel, and is closed by a detachable cover. In the channel, a valve is arranged, having a valve body axially displaceable between a closed and an open position. The cover on the housing presses the valve body into the closed position. When the cover is removed from the housing, the valve body is carried to its open position and then is detachable from the cover or insert and is retainable in its open position by a spring holding element. The holding element automatically expands into the opening position by spring force and engages a spring element restraint holding the valve body in its open position. A force contracts the spring element, displacing the valve body in the closing direction, releasing engagement with the spring restraint.

23 Claims, 25 Drawing Sheets

(52) U.S. Cl.
CPC ........... *B01D 2201/0415* (2013.01); *B01D 2201/291* (2013.01); *B01D 2201/305* (2013.01); *B01D 2201/316* (2013.01); *B01D 2201/4007* (2013.01); *B01D 2201/4046* (2013.01); *B01D 2201/4076* (2013.01); *B01D 2201/4084* (2013.01)

(56) References Cited

U.S. PATENT DOCUMENTS

| | | | |
|---|---|---|---|
| 6,811,694 B2 * | 11/2004 | Jainek | B01D 29/21 210/248 |
| 2002/0134726 A1 * | 9/2002 | Ardes | B01D 29/21 210/440 |
| 2009/0314697 A1 * | 12/2009 | Ardes | B01D 29/21 210/136 |

* cited by examiner

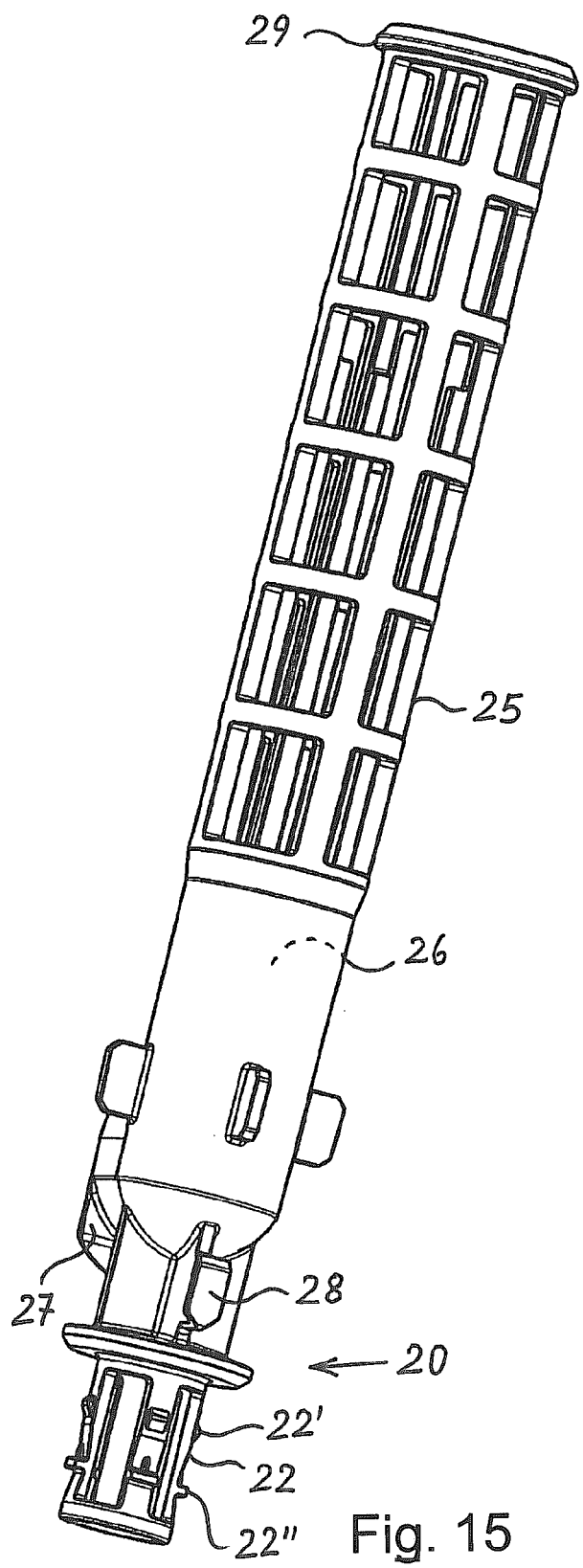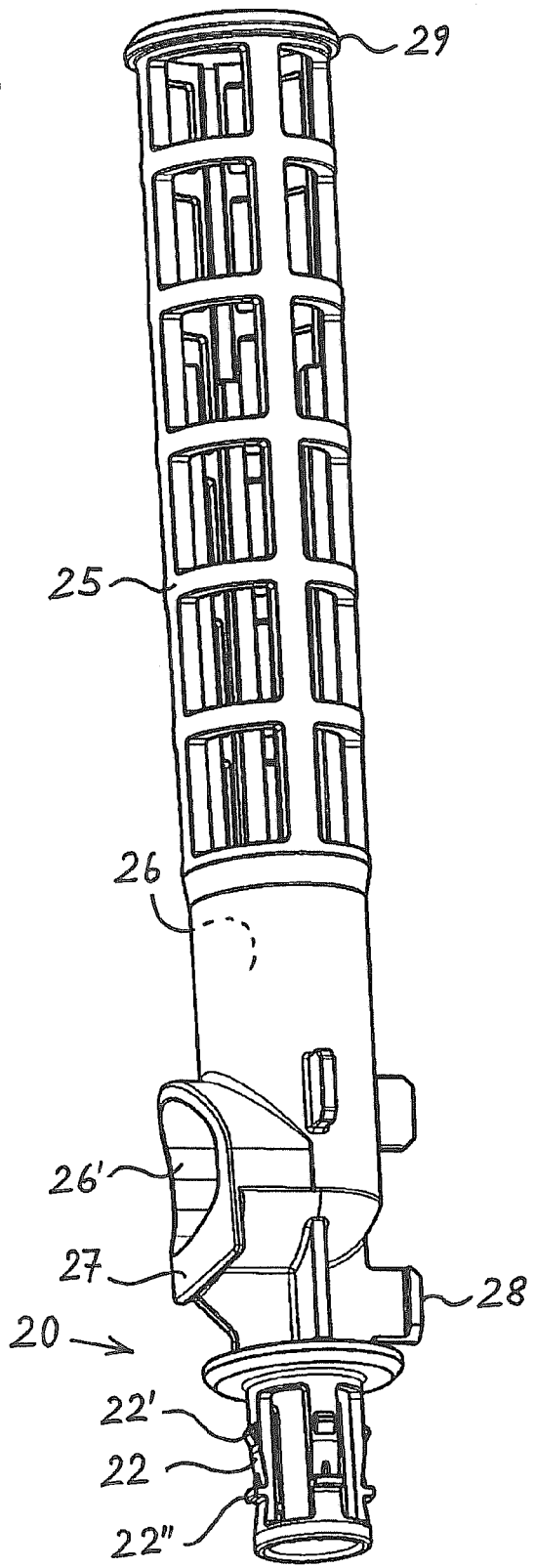
Fig. 15
Fig. 16

LIQUID FILTER HAVING A DRAINAGE VALVE

CROSS-REFERENCES TO RELATED APPLICATIONS

This application claims the benefit of the German patent application No. 10 2011 080 617.2 filed on Aug. 8, 2011, the entire disclosures of which are incorporated herein by way of reference.

BACKGROUND OF THE INVENTION

The invention relates to a liquid filter, in particular an oil or filter of an internal combustion engine.

A liquid filter of the aforementioned kind is known from DE 100 38 531 A1. This document shows a liquid filter, in particular for lubricating oil of an internal combustion engine, comprising a filter housing, a filter element, a support body and a slide valve, wherein the filter housing has a dirty liquid feed, a clean liquid outlet and a liquid drainage channel, wherein the filter housing has a housing body and a housing cover, which are connected to each other in a detachable and sealing manner, wherein the filter element is inserted into the housing in such a manner that a dirty side is sealingly separated from a clean side, wherein the filter element encloses an filter interior in which the support body is arranged, and wherein the liquid drainage channel is closed by the slide valve in an openable manner. It is important here that the slide valve is detachably connected to the support body or, alternatively, is connected to the cover via a connecting piece. The slide valve can have a centering region which is guided in the housing body. Here, the centering region can be guided in the housing body in such a manner that when replacing the filter, the slide valve is held by a clamping force, as a result of which a spring acting on the slide valve in the opening direction becomes dispensable.

It is regarded to be a disadvantage of this known liquid filter that in particular when manufacturing the centering region on the one hand, and the housing body part guiding said centering region, on the other, high accuracy with very tight tolerances is required so that these two parts can be moved relative to one another in any case with sufficiently high friction forces which are necessary for holding the slide valve in the open position, but, at the same time, not with friction forces which are too high and could cause a premature disconnection of the slide valve from the support body or the connecting piece. An additional difficulty is that over time, the centering region, which is constantly under tension, is subjected to relaxation and due to its friction in the housing body is subjected to wear, which influences the friction forces and, in particular, reduces the friction forces in the course of the operating time. Moreover, the O-ring seals used in this known liquid filter tend to adhere on the wall of the housing body, which makes it difficult to release the slide valve from its closed position, and which likewise can result in an unintentional premature disconnection of the slide valve from the support body or the connecting piece.

SUMMARY OF THE INVENTION

It is therefore an object of the present invention to create liquid filters of the kind mentioned above which avoid the cited disadvantages and which, with a simple construction, ensure a reliable and long-lasting secure function.

A first solution to the given object is achieved according to the invention with a liquid filter which is characterized in that the holding element is formed by at least one spring element which automatically expands into the open position of the valve body by its spring force and comes into attachment to a spring element restraint holding the valve body in its open position and which by exertion of a force contracts, and thus a displacement of the valve body is brought about, releasing engagement with the spring element restraint.

With the invention, a liquid filter is created in an advantageous manner in which the holding element performs its desired function with regard to the valve body in a secure and reliable manner. This long-lasting security and reliability is also maintained if the spring element forming the holding element is subjected during a long operating time to a certain relaxation because the spring element does not operate with a clamping effect involving friction, but rather by means of attaching to the associated spring element restraint. For the attachment of the filter element to the associated spring element restraint, certain dimensional tolerances or time-related dimensional changes have no effect on the function. Advantageously, a spring acting in the opening direction on the valve body is also not required for the liquid filter according to the invention.

In a preferred refinement of the liquid filter it is provided that the force contracting the holding element can be generated by exerting an axial thrust force on the filter insert or on the valve body in the closing direction thereof. In this embodiment, exerting the force necessary for contracting the holding element is particularly simple because by assembling the liquid filter and finally mounting the cover of the filter housing, such a thrust force is exerted anyway on the filter insert or the valve body. Special force exertion in a separate mounting step is therefore advantageously not required.

Furthermore, the invention proposes that the spring element is part of the valve body or is connected thereto, and that the spring element restraint as part of the filter housing or as part connected to the filter housing is arranged in the drainage channel. In this way, in particular the advantage is achieved that in the case of damage to the spring element, only the valve body has to be replaced or has to be connected to a new spring element in order to re-establish functionality. As an immovable component, the spring element restraint is not subjected to wear and therefore does not have to be configured in an exchangeable manner.

In a preferred refinement, the spring element is formed by one or more spring tongues which extend in the axial direction of the valve body from the lower end thereof, and which have in each case at least one holding cam on their outside, and the spring element restraint is formed by the upper side of a ring-shaped restriction of the drainage channel through which the spring tongues extend. In this configuration, on the one hand, the spring element is very simple in terms of its shape and, on the other, it is very reliable in terms of its function. Preferably, the spring tongues are implemented as one piece with the remaining valve body, which allows a particularly simple and cost-effective production. For this purpose, the valve body consists of an injection molded part made from an elastically flexible plastic, for example.

Furthermore, a particularly simple geometrical shape is obtained if, as preferably provided, the ring-shaped restriction of the drainage channel forms at the same time the valve seat of the drainage valve.

Advantageously, the valve body can interact with the valve seat in the drainage channel in an axially sealing manner, which securely excludes undesirably high friction between the valve body and the drainage channel.

In a refinement of the liquid filter it is provided that at an axial distance from the holding cams, the spring tongues each have on their outside another barb-shaped projection located towards their free ends, wherein the axial movement path of the valve body in the opening direction is limited by the projections abutting against the lower side of the ring-shaped restriction. In this way, the spring tongues in interaction with the restriction are given the additional function of a limit stop for the movement of the valve body in the opening direction.

In the liquid filter according to the invention, the spring element, instead of being formed by spring tongues, can alternatively also be formed by an annular spring which is arranged in a plane transverse to the axial direction of the valve body and can be deformed in this plane, wherein in the opening position of the valve body, the annular spring is unloaded and has its largest diameter and rests on the spring element restraint, and wherein by at least one forming element directly or indirectly connected to the cover and exerting a force on the annular spring, the diameter of the annular spring can be decreased when mounting the cover on the housing to such an extent that the annular spring becomes detached from the spring element restraint in the radially inward direction and, together with the valve body, can be displaced in the drainage channel in the closing direction relative to the spring element restraint. Also, with the spring element formed by the annular spring, the desired function of holding the valve body in its open position after disconnecting from the filter insert or cover is ensured in a secure and long-lasting manner.

Preferably, when viewed from above, the annular spring forming the spring element has a rhombic contour, wherein in the relaxed state, the annular spring rests with two outer rhombus corners, which oppose each other, on the spring element restraint, and wherein the forming element has two axially extending arms which, when mounting the cover on the housing, by expanding with the two other inner rhombus corners from inside towards the outside and thereby moving the two outer rhombus corners inwards, come into engagement with the annular spring. Here, the forming element is a simple component which can be provided without any problems with the necessary mechanical stability that is required for deforming the annular spring. Of course, the annular spring can also have a different, technically equivalent outer contour, for example an oval or an ellipse, or a hexagon or octagon, wherein it merely has to be ensured that by a forming element that is configured in a suitable manner, the annular spring can be deformed in such a manner that its diameter is sufficiently reduced in the regions interacting with the spring element restraint.

In order to hereby keep the construction simple, the forming element preferably is formed integrally with or fixedly connected to the filter insert or the cover.

Also, in the embodiments of the liquid filter having said annular spring, the valve body can have one or more spring tongues which extend in the axial direction of the valve body from the lower end thereof, and each of which have one barb-shaped projection on the outside, wherein the axial movement path of the valve body in the opening direction is limited by the projections abutting against the lower side of a ring-shaped restriction in the drainage channel. Here, the spring arms have no holding cams because their function is assumed here by the annular spring.

For all previously described embodiments of the liquid filter it is preferably provided that in an upper portion extending towards the cover, the valve body is configured as a standpipe onto which the filter insert is attached, and that the inside of the standpipe forms a clean liquid channel which runs to the clean liquid outlet and the lower channel end of which has an opening facing in the radial direction, wherein to said opening a portion of the clean liquid outlet is connected that likewise runs in the radial direction. The portion of the valve body configured as a standpipe provides centering support for the filter insert and, at the same time, makes a portion of the flow path available for discharging the filtered liquid.

In order to be able to reliably align the opening of the clean liquid channel with the clean liquid outlet when installing the valve body having the standpipe in the filter housing, it is preferably provided that on the outer circumference of the valve body and on the inner circumference of the drainage channel positioning means are arranged which, when inserting the valve body into the drainage channel, forcibly guide the valve body, viewed in the circumferential direction, into such a particular position relative to the drainage channel that the opening of the clean liquid channel comes into alignment with the subsequent portion of the clean liquid outlet. These positioning means can be configured as an embodiment known per se, for example, in the form of a rib on the circumference of the valve body, which rib interacts with a slot on the inner circumference of the drainage channel, or in the form of a nose radially on the outside of the valve body, which nose interacts with a ramp on the inner circumference of the drainage channel. In any case, the position means provide that the valve body comprising the standpipe and the clean liquid channel running therethrough are automatically fittingly positioned relative to the drainage channel and to the filter housing, without the need that an operator has to be particularly attentive.

During maintenance of the liquid filter, the drainage valve is opened by removing the cover from the filter housing so as to drain the liquid contained in the filter housing. In order to avoid as far as possible undesirable penetration of dirty liquid into the clean liquid channel, it is proposed that on the outer circumference of the valve body, below the opening of the clean liquid channel, a collar is attached or formed which shields the clean liquid outlet when the valve body is in the open position.

In the embodiments of the liquid filter having the annular spring, it is useful for simple operation to provide that the forming element is brought automatically in fitting engagement with the annular spring. For this purpose, the invention proposes that positioning means are arranged on the outer circumference of the standpipe and on the inner circumference of the forming element or the filter insert, which positioning means, when attaching the filter insert onto the standpipe, forcibly guide the forming element, viewed in the circumferential direction, in such a particular position relative to the standpipe and to the annular spring that the arms of the forming element come into engagement with the inner rhombus corners of the annular spring. Here too, the positioning means can be configured as an embodiment known per se, for example, as already briefly explained above by way of example.

In many cases of use of liquid filters, it is desired in the case of a clogged filter element to clear a bypass for the liquid so as to supply a downstream component with liquid, even if in this exceptional case, the liquid is not filtered. For this purpose, the invention proposes a liquid filter in which a bypass valve having an axially displaceable valve body is arranged, the closing direction of which points towards the cover, wherein a compression spring is arranged between the valve body of the drainage valve and the valve body of the bypass valve, which compression spring preloads both valve bodies at the same time in their respective closing direction when the cover is mounted on the filter housing. In this manner, the additional function of the filter bypass valve is integrated in the liquid filter, wherein the compression spring provided here advantageously has a double function. Thus, a single spring for preloading both valves in their respective closing direction is also sufficient for the embodiment of the liquid filter having a drainage valve and a filter bypass valve.

A spatially particularly beneficial arrangement is obtained if the valve body of the filter bypass valve is guided in an upper end region of the standpipe, and the compression spring is arranged in the standpipe and is supported on one side on the standpipe, and on the other side it is supported on the valve body of the filter bypass valve. Thus, without interposition of any other components, the compression spring exerts its force directly on both the valve body of the drainage valve and the valve body of the filter bypass valve, thereby avoiding a loss of force caused by friction.

In order to achieve a handling as simple and clean as possible for the operating personnel, it is proposed that a first latching connection is provided between the cover and the filter insert, that a second latching connection is provided between the filter insert and the valve body of the drainage valve, and that the holding force of the first latching connection is higher than the holding force of the second latching connection. Hereby it is ensured during the removal of the cover from the filter housing that first the filter insert and also the valve body of the drainage valve are carried along by the cover. However, as soon as the valve body reaches its movement stop in the opening direction, the weaker latching connection between the filter insert and the valve body disengages while the stronger latching connection between the cover and the filter insert remains latched. Thus, the filter insert together with the cover is removed from the filter housing. Subsequently, the filter insert can be detached from the cover and a new filter insert can be latched with the cover. When mounting the cover on the filter housing, the new filter insert is latched with the valve body of the drainage valve so that during the next maintenance, the above-described process can take place again.

Another configuration in this connection provides that the two latching connections are adapted to allow mutual rotating of the parts connected via said latching connections, namely the cover, the filter insert and the valve body of the drainage valve, and to transmit a limited torque at the same time. In this configuration, a cover in the form of a screw cover of the filter housing can be used. The rotation of the screw cover for the purpose of mounting the cover on the filter housing is transmitted via the latching connections to the valve body so as to bring the latter, in interaction with the above-described positioning means, into the desired rotational position. As soon as the positioning means have come into positioning engagement with each other, the valve body cannot be rotated any further so that now the latching connections are rotated relative to each other until the cover has reached its final closing position.

A second solution to the above-given object is achieved according to the invention with a liquid filter, in particular oil or fuel filter of an internal combustion engine which is characterized in that in the liquid filter, a filter bypass valve is arranged which has an axially displaceable valve body, the closing direction of which points towards the cover, and that a compression spring is arranged between the valve body of the drainage valve and the valve body of the filter bypass valve, which compression spring preloads both valve bodies at the same time in their respective closing direction when the cover is mounted on the housing.

With this second liquid filter according to the invention, which in addition to drainage valve also has a filter bypass valve, an advantageously simple construction is achieved because for preloading the valve body of the drainage valve and the valve body of the filter bypass valve in each case in their closing direction, only a single common spring is needed. This reduces the number of required individual parts and simplifies assembling the liquid filter during its production, which results in lower costs.

For the second liquid filter it is preferably furthermore provided that the valve body of the drainage valve is detachably connected to the cover or the filter insert. Hereby is achieved that when removing the cover from the filter housing, the valve body of the drainage valve is directly or indirectly carried along in the opening direction via the filter insert, as a result of which emptying the filter housing takes place, which allows to remove a filter insert that is liquid-free to the greatest possible extent.

In order to ensure simple handling for the previously described process, it is furthermore proposed that when removing the cover or the filter insert from the filter housing in the axial direction thereof, the valve body can first be carried along by the cover or the filter insert in the opening direction up to its open position and can then be automatically detached from the cover or the filter insert. Manually detaching the valve body of the drainage valve from the cover or filter insert thus is avoided.

Depending on the viscosity of the liquid flowing through the liquid filter and depending on the cross-section of the drainage channel, the time it takes to empty the filter housing with the drainage valve open can vary. In order to ensure that the filter housing is completely emptied even in the case of a longer period needed for emptying, it is proposed that the valve body, after it is detached from the cover or the filter insert, can be kept in its open position by means of a holding element.

In order to achieve an advantageous and space-saving arrangement of the valve bodies of the drainage valve and filter bypass valve and the common spring preloading the valve bodies, it is preferably provided that in an upper portion extending towards the cover, the valve body is configured as a standpipe onto which the filter insert is attached, that the interior of the standpipe forms a clean liquid channel that runs to the clean liquid outlet, that the valve body of the filter bypass valve is guided in an upper end region of the standpipe, and that the compression spring is arranged in the standpipe and is supported on one side on the standpipe, and on the other side it is supported on the valve body of the filter bypass valve. As is known per se, the valve seat of the filter bypass valve can be formed here in an upper end plate of the filter insert. In this manner, the number of individual parts in the filter housing can be kept low, which facilitates easy assembling and a reliable function of the liquid filter.

BRIEF DESCRIPTION OF THE DRAWINGS

Hereinafter, exemplary embodiments of the invention are explained with reference to a drawing. In the figures:

FIG. 15 shows the valve body of the liquid filter in a first view, FIG. 16 shows the valve body in a second rotated view.

In the following description of the Figures, identical parts in the different Figures are always designated by the same reference numeral so that all reference numerals are not explained for all Figures in each case.

DETAILED DESCRIPTION OF THE PREFERRED EMBODIMENTS

Figure 1:
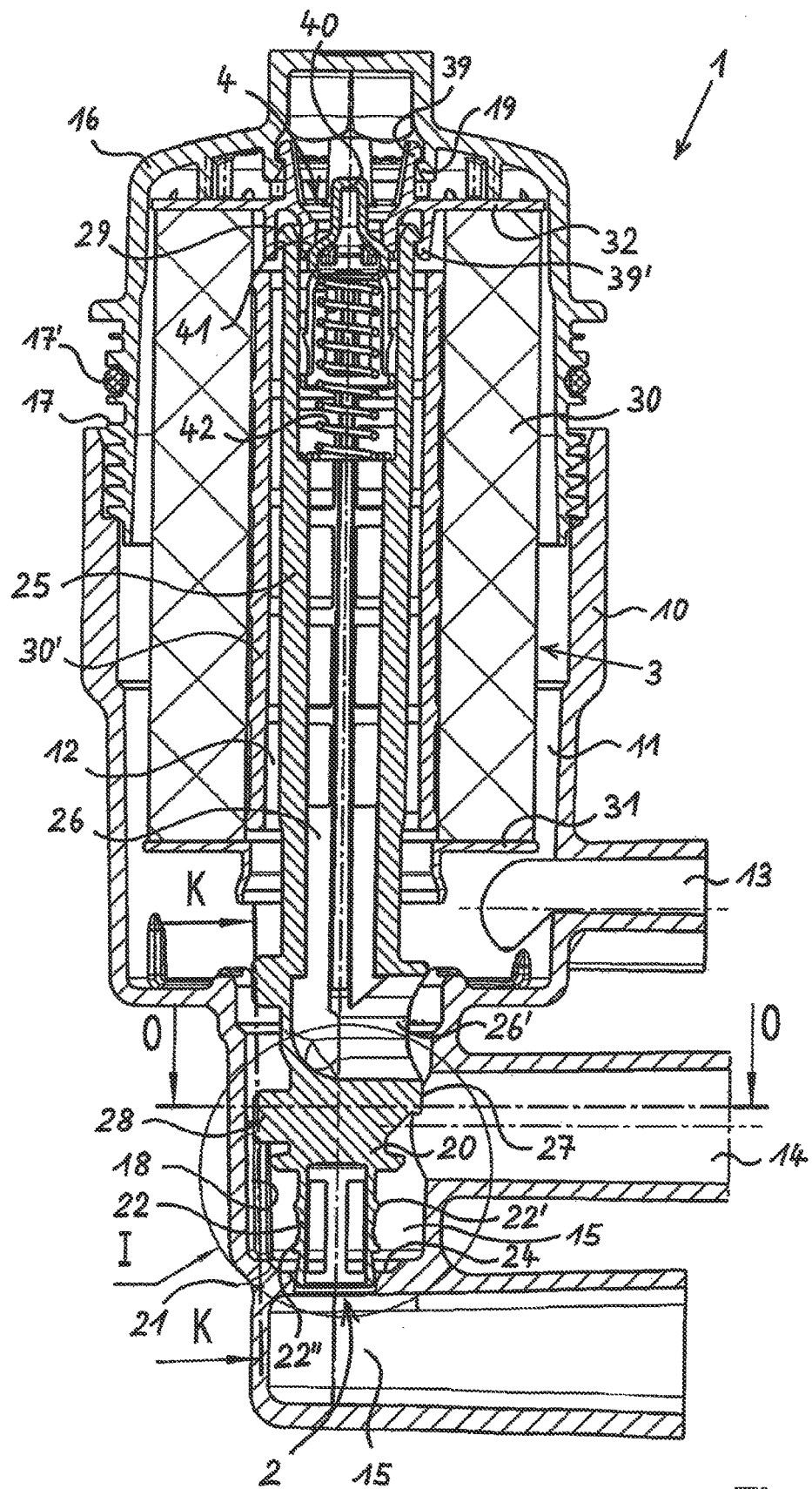
FIG. 1 shows a liquid filter in a first embodiment in a longitudinal section, in a state during its first assembling.

FIG. 1 of the drawing shows a first liquid filter 1 in a longitudinal section during its first assembling. The liquid filter 1 comprises a filter housing 10 which is cup-shaped in its upper portion and can be tightly closed on its top side with a screw cover 16 by means of a screw connection 17 and by placing a seal 17' therebetween. Inside the filter housing 10, a hollow-cylindrical filter insert 3 is arranged which separates the interior of the filter housing 10 into a dirty side 11 and a clean side 12. The dirty side 11 is connected to a dirty liquid feed 13; the clean side 12 is connected to a clean liquid outlet 14. In addition, there is also a liquid drainage channel 15 which serves for emptying the filter housing 10 during filter maintenance.

The filter housing 10 with the dirty liquid feed 13, the clean liquid outlet 14 and the liquid drainage channel 15 is advantageously a die-cast component made from light metal. The cover 16 can also be a die-cast component from light metal or, as an alternative, can also be an injection molded part from plastic.

The filter insert 3 comprises a hollow-cylindrical, folded or wound filter cloth body 30 which is enclosed on the front sides by a lower end plate 31 and an upper end plate 32. Inside the filter cloth body 30, a support grid 30' is arranged which supports the filter cloth body 30 against collapsing when a flow passes through in the radial direction from the outside to the inside.

In the lower portion of the filter housing 10, a drainage valve 2 is arranged in the course of the liquid drainage channel 15. Said drainage valve comprises a valve body 20 which interacts with a valve seat 21 that is molded in the drainage channel 15 and forms a restriction of the channel. Towards the top, the valve body 20 is configured as a standpipe 25 which is closed in a lower portion and is grid-shaped in an upper portion. A clean liquid channel 26 runs through the interior of the standpipe 25 and ends at its lower end in a radially outward facing opening 26'. Through the grid-shaped portion of the standpipe 25, the clean liquid channel 26 is in flow communication with the clean side 12 of the liquid filter 1.

On the top side of its upper end plate 32, the filter insert 3 has latching connection means 39 which here are in latching engagement with latching connection means 19 on the inner side of the cover 16. Further latching connection means 39' are formed on the bottom side of the upper end plate 32 and are here in latching engagement with a latching connection means 29 at the upper end of the standpipe 25. In this manner, a pre-assembled unit comprising the cover 16, the filter insert 3 and the valve body 20 with the standpipe 25 is formed, which, as a unit, can be connected from above with the filter housing 10 in the manner shown in FIG. 1. For this purpose, the valve body 2 is inserted into the housing 10 and into the liquid drainage channel 15 situated therein until the cover 16 rests loosely on the upper edge of the filter housing 10. This state is illustrated in FIG. 1.

By rotating the cover 16, said cover is brought into screwed engagement with the filter housing 10, by which means the filter insert 3 and the valve body 20 with the standpipe 25 are moved downwards at the same time.

From the lower end of the valve body 20, a plurality of spring tongues 22, here four of them, extend axially downwards. Each spring tongue 22 carries on its outer side in each case one holding cam 22' and one barb-shaped projection 22". During the downward movement of the valve body 20 when assembling the liquid filter 1, the spring tongues 22 are slid downwards through the valve seat 21 thereby deflecting radially inwards, and thereafter, the spring tongues 22 spring back into their initial position. An upper edge of the valve seat 21 forms a spring element restraint 24 which, in the state of the liquid filter 1 according to FIG. 1, has no function yet.

The clean liquid outlet 14 runs in the radial direction and, in the assembled state of the liquid filter 1, is connected with the opening 26' of the liquid filter 1. In order that the opening 26' and the clean liquid drainage 14 come into alignment with each other during the assembly of the liquid filter 1, interacting positioning means 18 and 28 are provided in the drainage channel 15 and on the valve body 20. The positioning means 18 is a slot running in the axial direction of the drainage channel 15, and the associated positioning means 28 on the valve body 20 is a radially outward protruding tongue that is fed through the slot.

Figure 2:
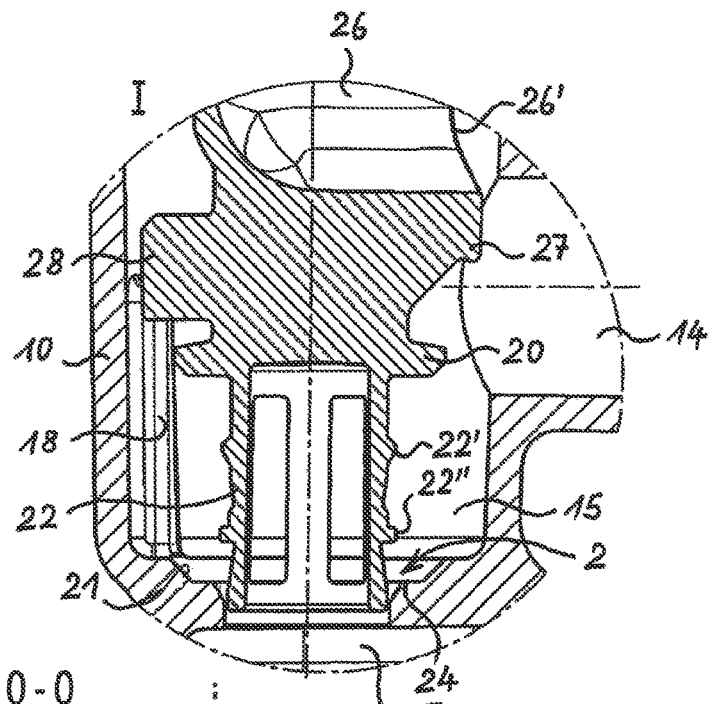
FIG. 2 shows the detail I encircled in FIG. 1 in an enlarged illustration.

FIG. 2 illustrates as an enlarged detail I from FIG. 1 the lower region of the valve body 20 with the part of the filter housing that surrounds said valve body. On the left in FIG. 2, the positioning means 18 and 28 are shown which forcibly guide the opening 26' in alignment with the clean liquid drainage 14 during the axial insertion of the valve body 20 into the drainage channel 15. On the bottom side of the valve body 20, the spring arms 22 are arranged, which each have the holding cam 22' and the projection 22" on their outer side. In the state according to FIG. 1 and FIG. 2, the valve body 20 protrudes with its spring tongues 22 straight into the valve seat 21 of the drainage valve 2.

Top right in FIG. 2, a portion of the opening 26' of the clean liquid channel 26 in the standpipe 25 can also be seen. Below the opening 26', a collar 27 is molded onto the standpipe 26, the function of which is explained below.

Figure 3:
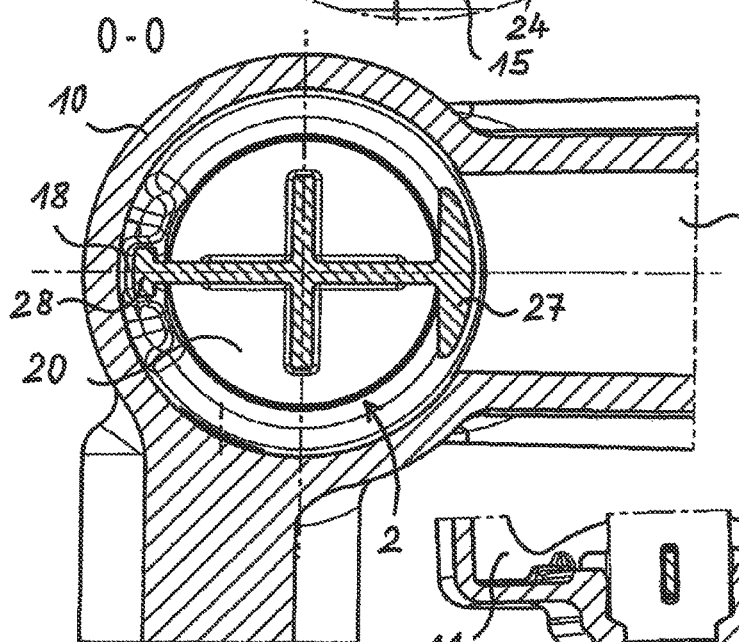
FIG. 3 shows a section according to the line O-O in FIG. 1.

FIG. 3 shows a section according to line O-O in FIG. 1, which section extends through the region of the clean liquid outlet 14 that is shown in the right part of FIG. 3. On the left thereof, there is the drainage valve 2 with the valve body 20, which can be seen here from above. On the left side of the valve body in FIG. 3, the positioning means 28 is formed, which interacts with the slot- or groove-shaped positioning means 18 on the inner surface of the filter housing 10. On the side opposite from the positioning means 28, the collar 27 of the standpipe 25 is shown.

Figure 4:
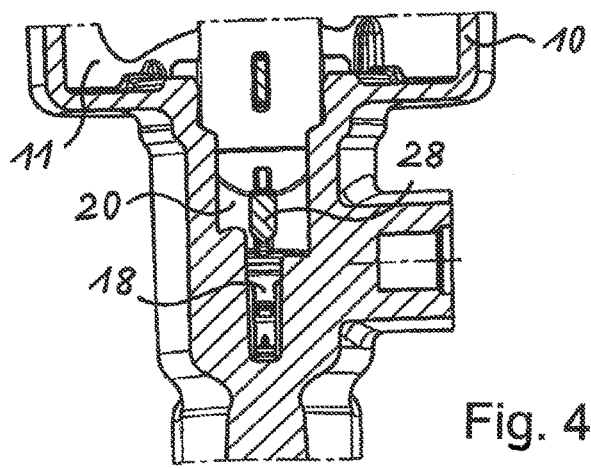
FIG. 4 shows a section according to the line K-K in FIG. 1.

FIG. 4 illustrates by means of the section according to the line K-K in FIG. 1 the interaction between the positioning means 18 and 28. When screwing on the cover, the cover transmits by means of the latching connection means a limited torque to the valve body 20 so that the latter is first rotated together with the screw cover. When the position shown in FIG. 4 is reached, the positioning means 28 on the outer circumference of the valve body 20 abuts against an edge of the slot-shaped positioning means 18, as a result of which further rotation of the valve body 20 is prevented. Rather, from now on, the valve body 20 can only move downwards in the axial direction, wherein the positioning means 28 moves further down within the slot-shaped positioning means 18. In the course of this, the cover rotates in the latching connection means relative to the valve body 20.

Figure 5:
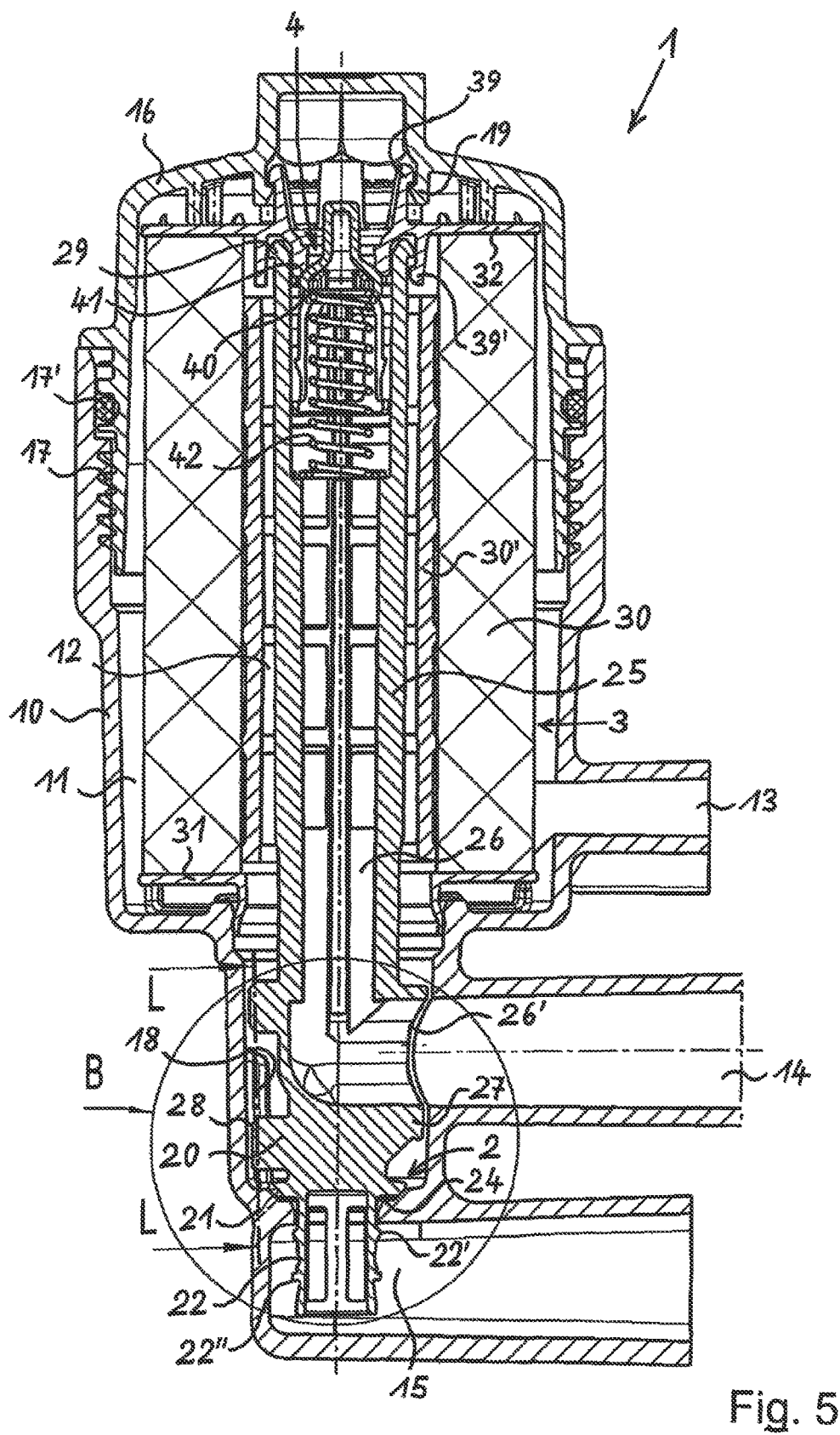
FIG. 5 shows the liquid filter from FIG. 1 in a longitudinal section, in its assembled operating state.

In FIG. 5, the liquid filter 1 is shown in the same illustration as in FIG. 1, but now in its assembled operating state. The cover 16 is now firmly screwed to the filter housing 10. The valve body 20 has reached its closed position in which the valve body sealingly rests on the valve seat 21. The spring arms 22 protrude through the valve seat 21, wherein now the holding cams 22' as well as the projections 22" are pushed through the valve seat and lie below the valve seat 21. The opening 26' is now in complete alignment with the clean liquid outlet 14.

In this state of the liquid filter 1, dirty liquid to be filtered can now be fed through the dirty liquid feed 13 to the dirty side of the filter 1. From the dirty side 11, the liquid flows through the filter cloth body 30 of the filter insert 3 to the clean side 12 which is in flow communication with the clean liquid channel 26 in the standpipe 25. The filtered clean liquid is discharged through the clean liquid channel 26 and then through the clean liquid outlet 14. The drainage valve 2 is closed here so that no liquid flows through the liquid drainage channel 15.

As is apparent from FIG. 5 and also FIG. 1, in addition to the drainage valve 2, the liquid filter 1 also comprises a filter bypass valve 4 which is arranged in the upper region of the standpipe 25 and the filter insert 3. For this, a valve body 40 is guided in an axially displaceable manner within the upper end region of the standpipe 25. In the upper end plate 32 of the filter insert 3, a suitable valve seat 41 is formed, with which the valve body 40 interacts. The valve body 40 is preloaded in the closing direction by a compression spring 42 and is pressed against its valve seat 41. The compression spring 42 is supported at its other end on a step in the standpipe 25 so that when the cover 16 is attached, the spring also exerts via the standpipe 25 a preloading force onto the valve body 20 of the drainage valve 2, which preloading force is directed in the closing direction of the drainage valve 2.

Figure 6:
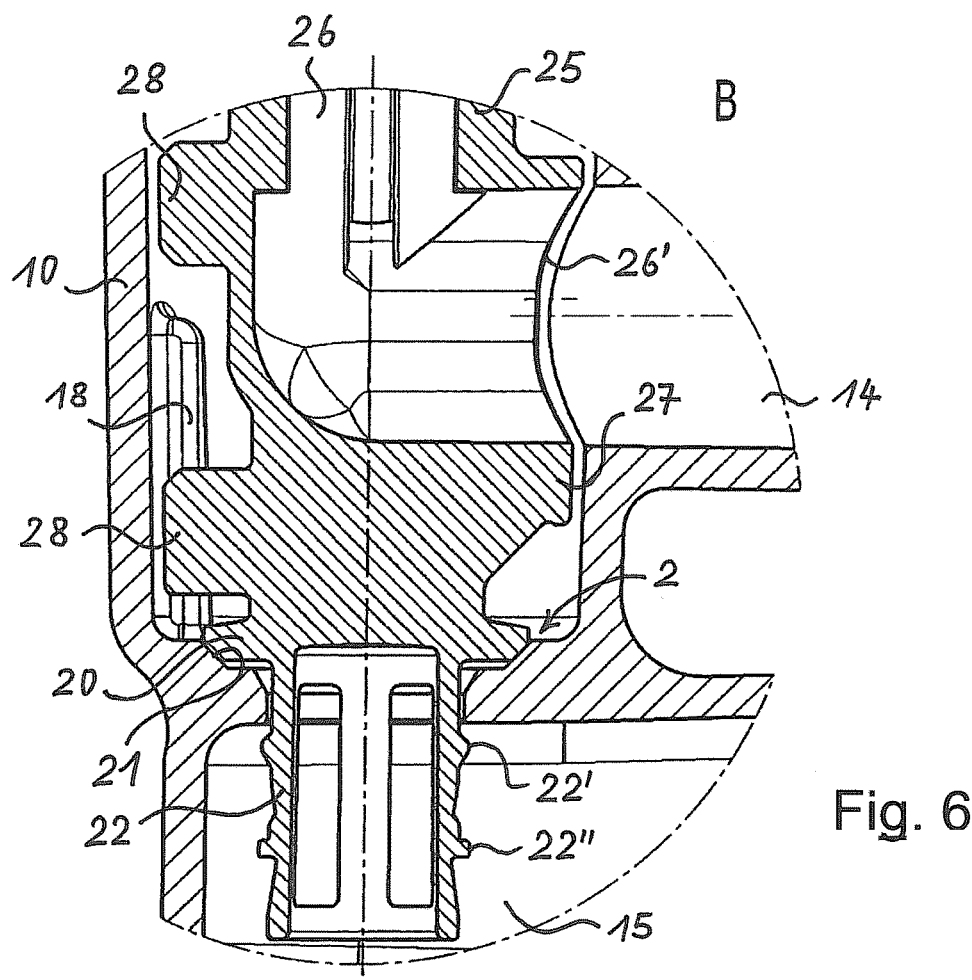
FIG. 6 shows the detail B encircled in FIG. 5 in an enlarged illustration.

In FIG. 6, the detail B encircled in FIG. 5 is shown in an enlarged illustration. In the center of FIG. 6, the valve body 20 is visible which rests here sealingly engaged against the valve seat 21. The spring arms 22 protrude through the valve seat 21 and each of them carries the holding cam 22' and the projection 22" on their outer side. In the upper part of FIG. 6, a small portion of the standpipe 25 with the clean liquid channel 26 running therein is shown, the opening 26' of the latter being in complete alignment with the clean liquid outlet 14. This mutual alignment of the opening 26' and the clean liquid outlet 14 is ensured by the interacting positioning means 18 and 28.

Figure 7:
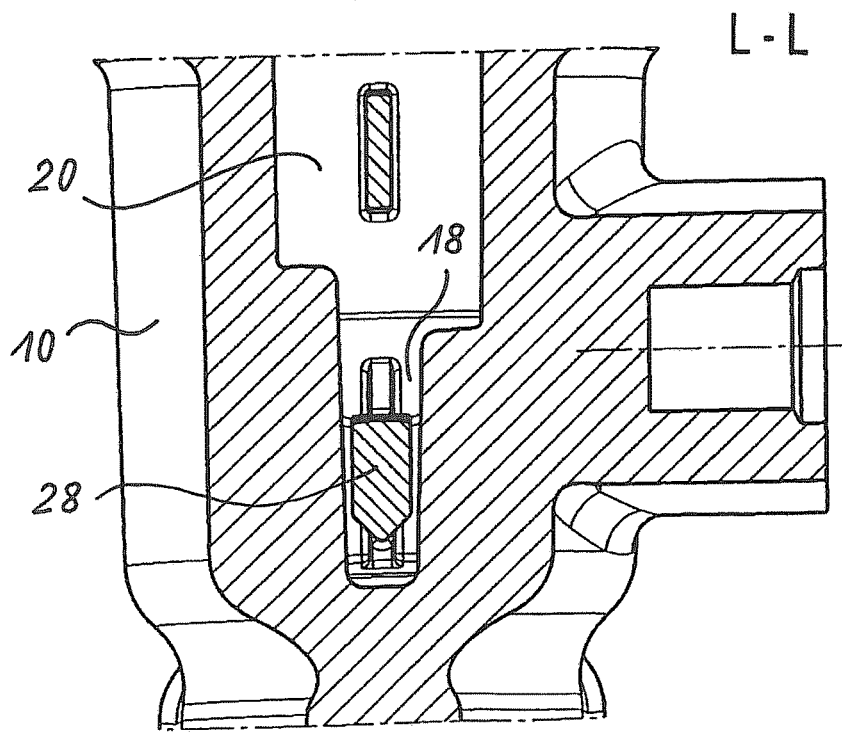
FIG. 7 shows a section according to the line L-L in FIG. 5.

FIG. 7, in the same illustration as FIG. 4, shows the interaction of the positioning means 18 and 28, wherein here the positioning means 28 has now reached its end position in the slot-shaped positioning means 18. In the background, a small portion of the outer circumference of the valve body 20 within the filter housing 10 is also shown.

Figure 8:
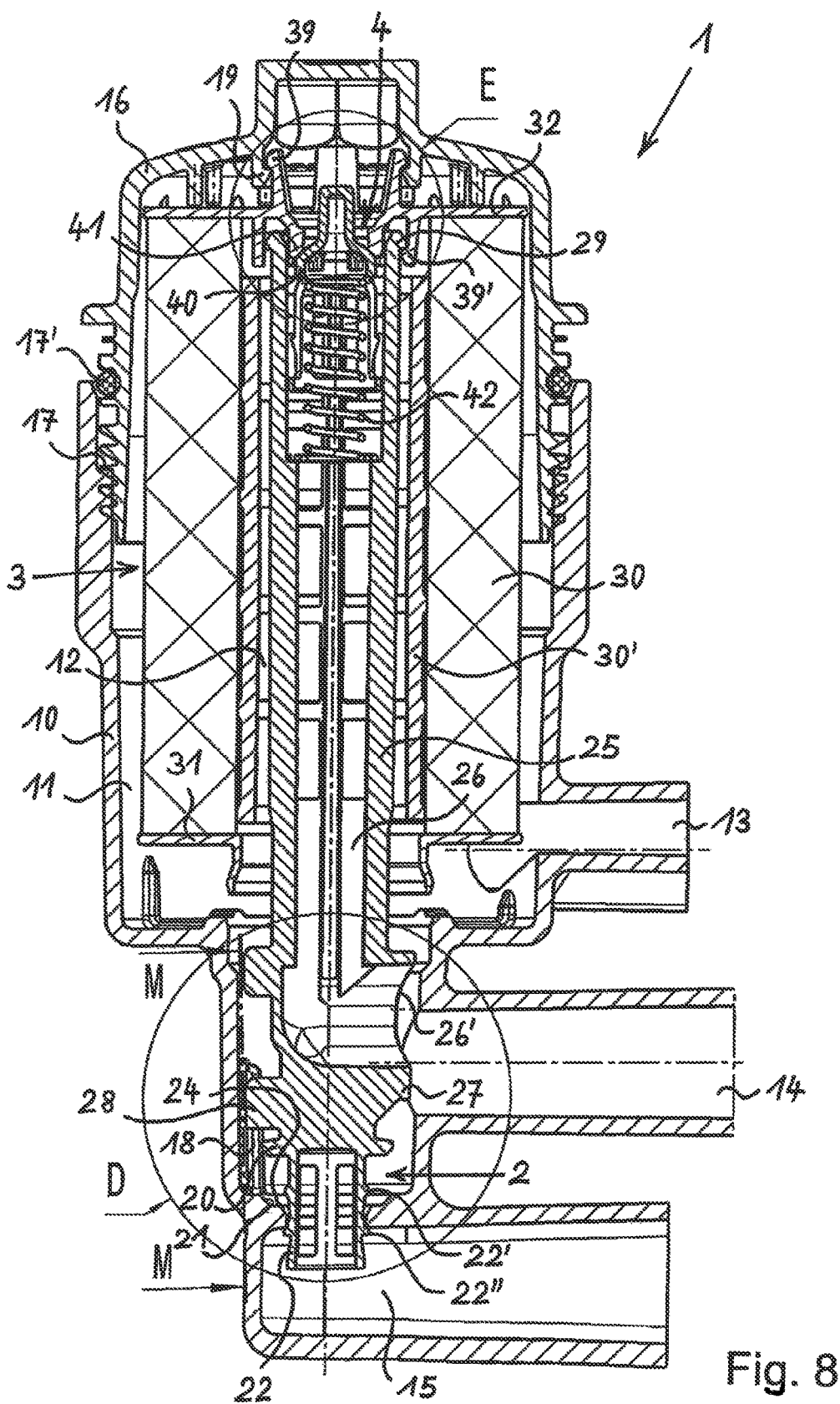
FIG. 8 shows the liquid filter from FIG. 1 in a longitudinal section, in a state during filter maintenance.

FIG. 8 of the drawing shows the liquid filter 1 according to FIG. 1 in a state during filter maintenance. For the purpose of cleaning, the cover 16 is unscrewed from the filter housing 10, as a result of which the cover 16 together with the filter element 3 latched thereto and the valve body 20, including the standpipe 25, which is latched to the filter element 3 are first moved upwards relative to the filter housing 10. Hereby, the spring arms 22 are moved upwards relative to the valve seat 21 until the projections 22" abut against the bottom side of the valve seat 21 and block a further upward movement of the valve body 20. Further unscrewing of the cover 16 from the filter housing 10 then effects that the latching connection between the valve body 20 and the filter element 3 is automatically released via the latching connection means 29 and 39' so that then the cover 16 only drives the filter insert 3 connected via the latching connection means 19 and 39.

As soon as the valve body 20 with the standpipe 25 is detached from the filter insert 3, the valve body 20 falls downward by a short distance, but only so far until the holding cams 22' abuts against the spring element restraint 24 on the top side of the valve seat 21. As long as now no other forces are exerted onto the valve body 20, the valve body keeps this position, in which the drainage valve 2 is open. The liquid contained inside the filter housing 10 can flow through the open drainage valve 2 into the liquid drainage channel 15 which, for example, leads to an oil sump of an associated internal combustion engine. Since the valve body 2 is kept in the open position, even a liquid of high viscosity has time enough to drain completely from the filter housing 10. By means of the collar 27 formed below the opening 26', penetration of draining liquid into the clean liquid outlet 14 is prevented to the largest possible extent.

Figure 9:
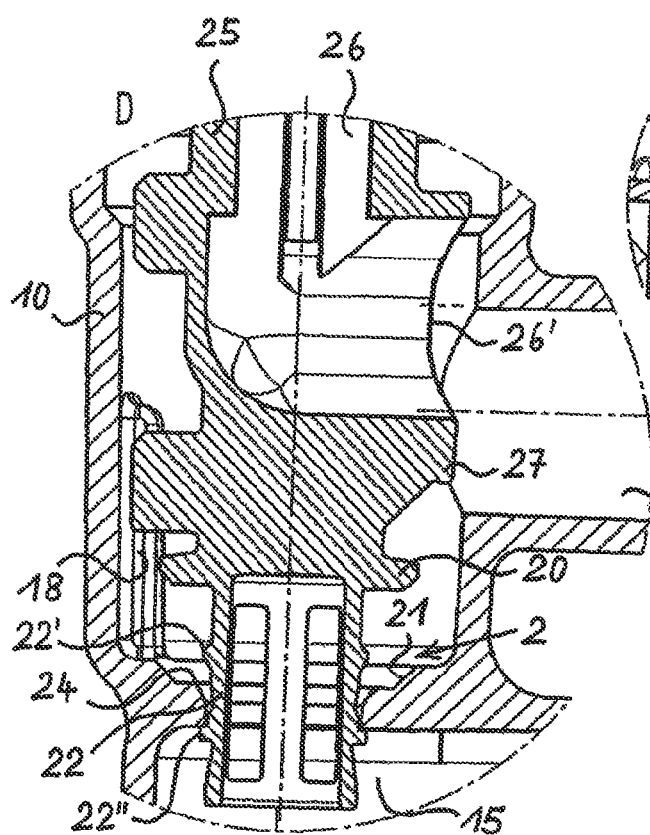
FIG. 9 shows the detail D encircled in FIG. 8 in an enlarged illustration.

In FIG. 9, the detail D encircled in Figure is shown in an enlarged illustration. In the center of FIG. 9, the valve body 20 can be seen, which is now spaced apart from the valve seat 21 so that the drainage valve 2 is now open. The spring arms 22 extend through the valve seat 21. The projections 22" abut in a blocking manner against the bottom side of the valve seat 21 and do not allow any further upward movement of the valve body 20. On top in FIG. 9, a short portion of the standpipe 25 with the clean liquid channel 26 is visible, which transitions to the right into the opening 26'. The collar 27 shields the clean liquid outlet 14 to a large extent against penetration of unfiltered liquid that flows off through the liquid drainage channel 15.

Figure 10:
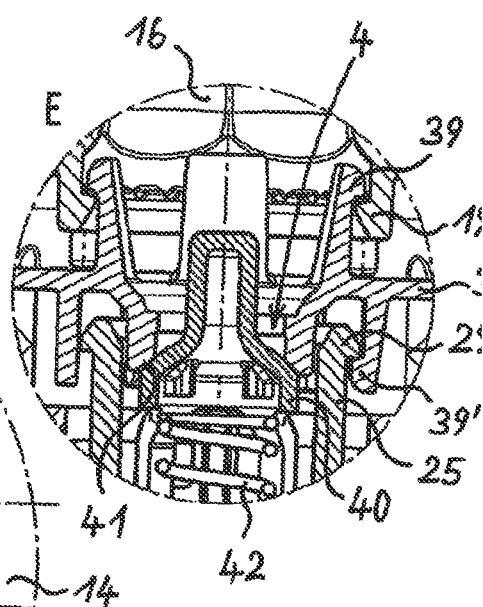
FIG. 10 shows the detail E encircled in Figure in an enlarged illustration.

In FIG. 10, the detail E encircled in FIG. 8 is shown in an enlarged illustration, which substantially shows the filter bypass valve 4. In the upper end plate 32, the valve seat 41, which interacts with the valve body 40, is formed as a central through hole. The valve body 40 is sealingly pressed against the valve seat 41 by the compression spring 42 as long as a differential pressure between the dirty side 11 and the clean side 12 does not exceed a predetermined limit value. If said limit value is exceeded, the filter bypass valve 4 opens and by bypassing the filter cloth body, the liquid can flow from the dirty side to the clean side.

Radially outside of the valve body 40, the latching connection means 29 and 39' are visible between the filter insert and the standpipe 25; above the upper end plate 32, there are the latching connection means 19 and 39 which detachably connect the filter insert and the cover 16.

Figure 11:
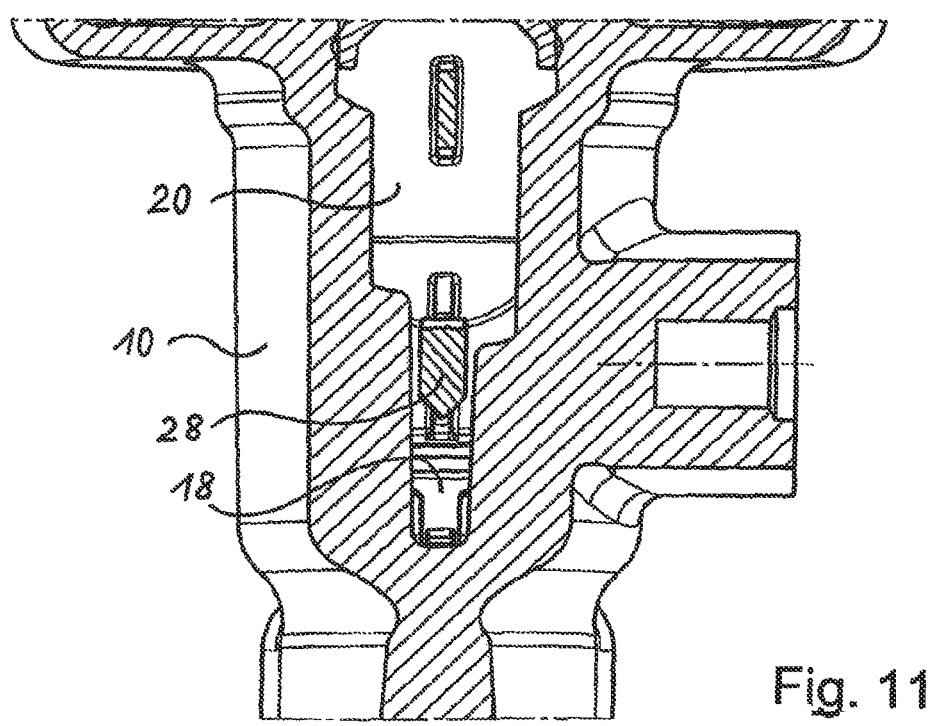
FIG. 11 shows a section according to the line M-M in FIG. 8.

FIG. 11 shows a section according to the line M-M in FIG. 8, which, by using the same illustration as the FIGS. 4 and 7, demonstrates the interaction of the positioning means 18 and 28. FIG. 11 illustrates in particular that the positioning means 18 and 28 maintain their positioning engagement relative to each other even in the open state so that the valve body 20 with the standpipe 25 cannot be rotated relative to the filter housing 10.

FIG. 12 shows again the liquid filter 1 from the preceding Figures in a longitudinal section, but now with the cover and filter insert completely removed. The filter housing 10 is open towards the top and is empty. In the liquid drainage channel 15, the valve body 20 is in a position lifted from the valve seat 21 so that the drainage valve 2 is still open. The valve 20 is held in this position by the holding cams 22' abutting against the spring element restraint 24 which is formed on the top side of the valve seat 21. Self-actuated falling of the valve body 20 back onto valve seat 21 into the closing position is therefore prevented. Liquid possibly still contained in the filter housing 10 thus has enough time to drain through the open drainage valve 2 and the drainage channel 15. By means of the collar 27, the clean liquid outlet 14 is largely protected against penetration of unfiltered draining liquid.

In the upper portion of the standpipe 25, the valve body 40 and the compression spring 42 as parts of the filter bypass valve are arranged, wherein due to the missing filter element and cover, the spring 42 is now relaxed. Thus, the spring 42 cannot exert a preloading force on the valve body 20 of the drainage valve 2 in the closing direction thereof. At the upper edge of the standpipe 25, the latching connection means 29 thereof can also be seen, which latching connection means serves for detachably connecting the standpipe 25 to the filter element.

Figure 12:
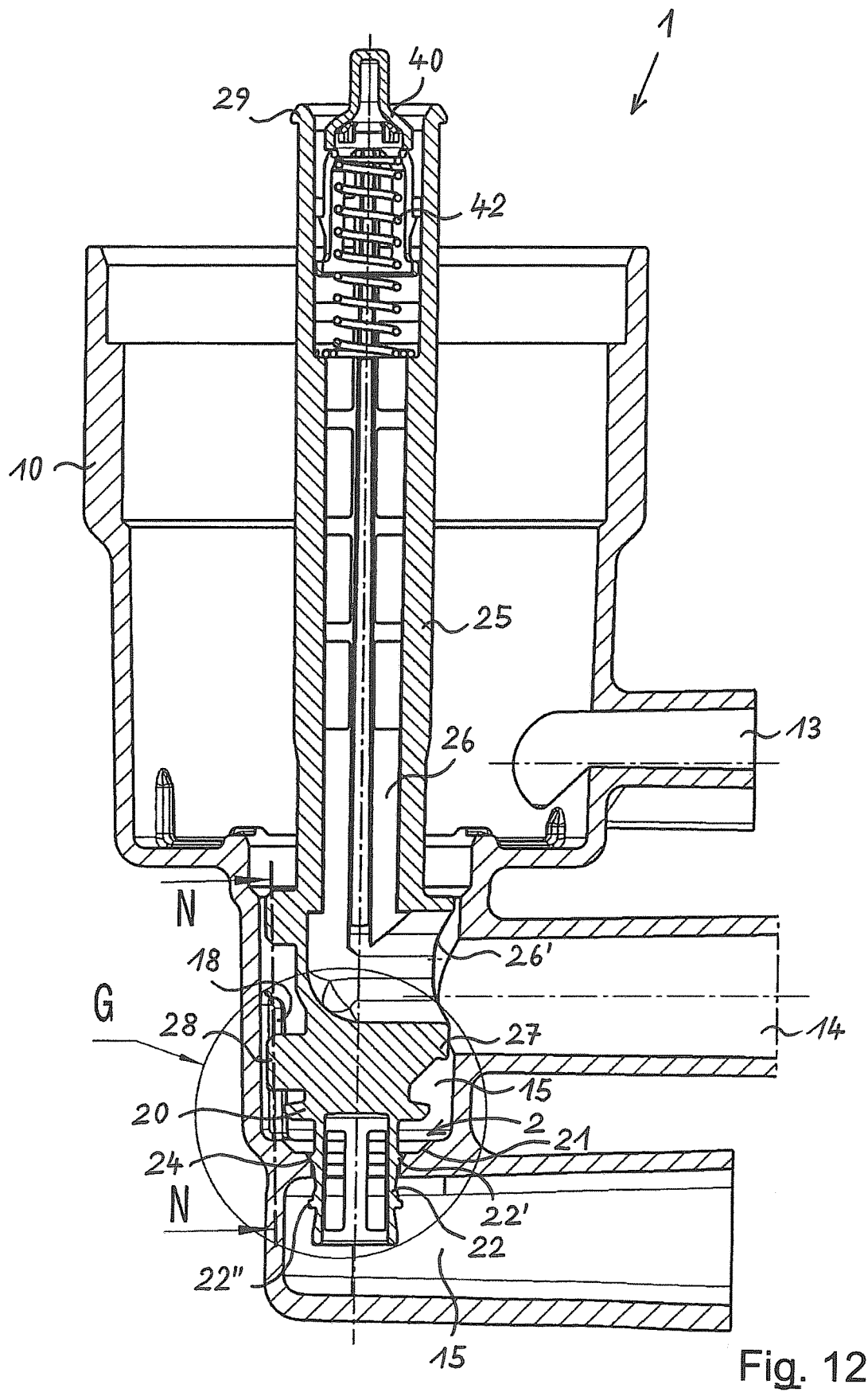
FIG. 12 shows the liquid filter from FIG. 1 in a longitudinal section, with cover and filter insert removed during filter maintenance.
Figure 13:
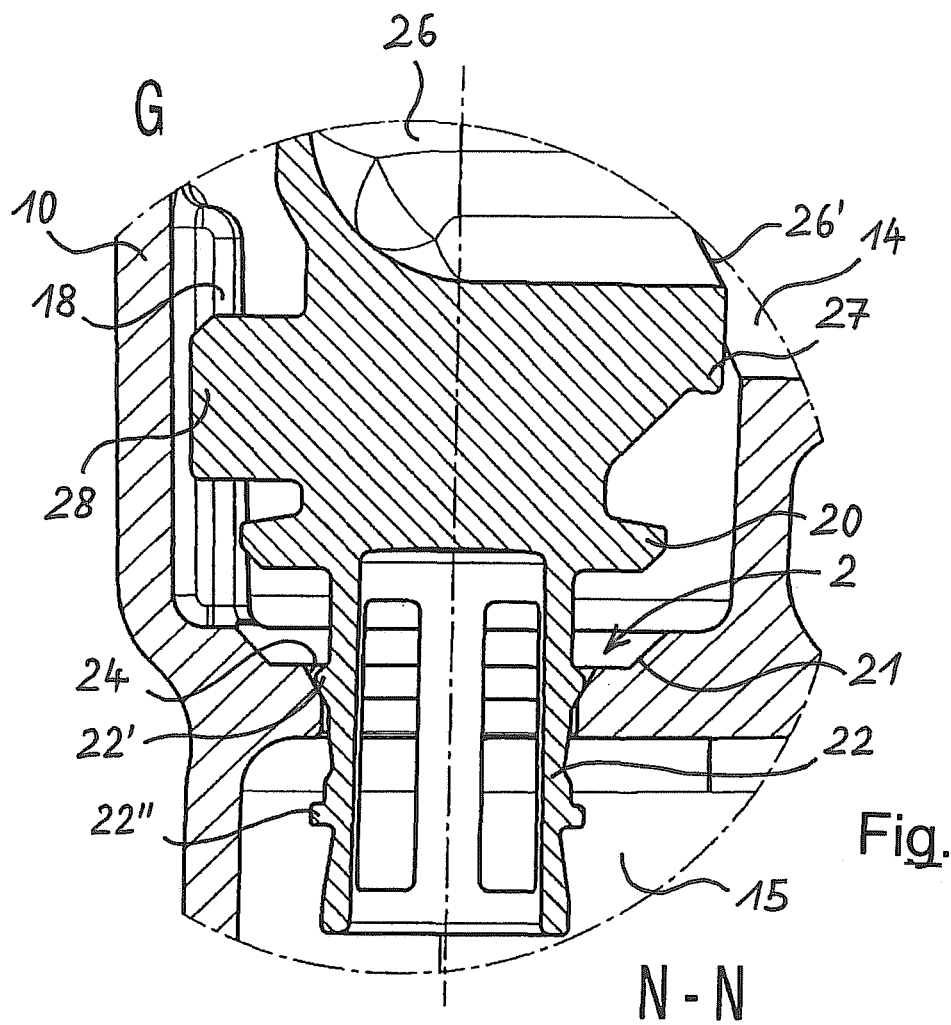
FIG. 13 shows the detail G encircled in FIG. 12 in an enlarged illustration.

FIG. 13 shows the detail G encircled in FIG. 12 in an enlarged illustration. In the center of FIG. 12, there is shown again the valve body 20 which is spaced apart from the valve seat 21 so that the drainage valve 2 is open. The spring arms 22 extend through the valve seat 21, wherein now the holding cams 22' rest against the spring element restraint 24 at the upper edge of the valve seat 21. This prevents that the valve body 20 falls downwards into its closing position due to gravity.

On the left in FIG. 13, the interacting positioning means 18 and 28 are shown, which ensure that the opening 26' of the clean liquid channel 26 remains in alignment with the clean liquid drainage 14. The collar 27 is formed below the opening 26'.

Figure 14:
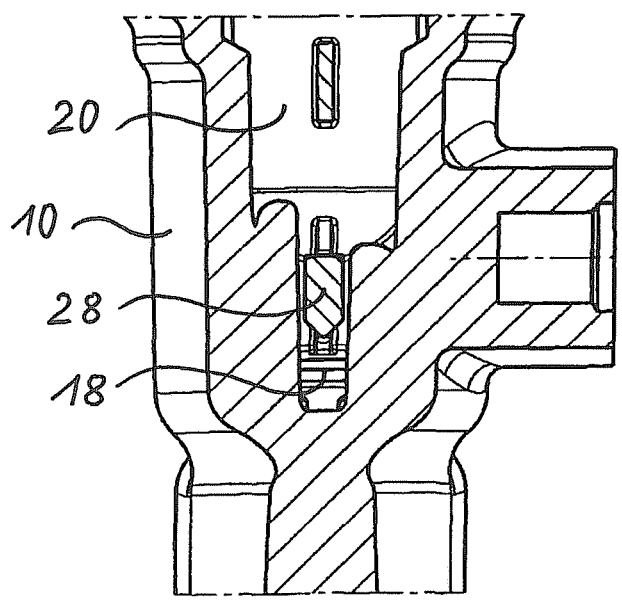
FIG. 14 shows a section according to the line N-N in FIG. 12.

FIG. 14 shows again the interaction between the positioning means 18 and 28 in the same illustration as shown in the FIGS. 4, 7 and 11. FIG. 14 illustrates that when the holding cams 22' come into attachment to the spring element restraint 24, the positioning means 18 and 28 remain in engagement with each other even in the open state of the drainage valve 2.

The FIGS. 15 and 16 each show the valve body 20 including the standpipe 25 in two different views that are rotated with respect to each other. The spring arms 22, each having the holding cam 22' and the projection 22", extend from the bottom side of the valve body 20. Further up at the outer circumference of the valve body 20, there is the positioning means 28 in the form of the radially projecting tongue or rib. In the background in FIG. 15, a portion of the collar 27 is shown. The clean liquid channel 26, which is not visible here, runs through the inside of the standpipe 25. The upper end of the standpipe 25 comprises the latching connection means 29. The view according to FIG. 16, which is rotated with respect to FIG. 15, also shows the opening 26' of the clean liquid channel 26.

Figure 17:
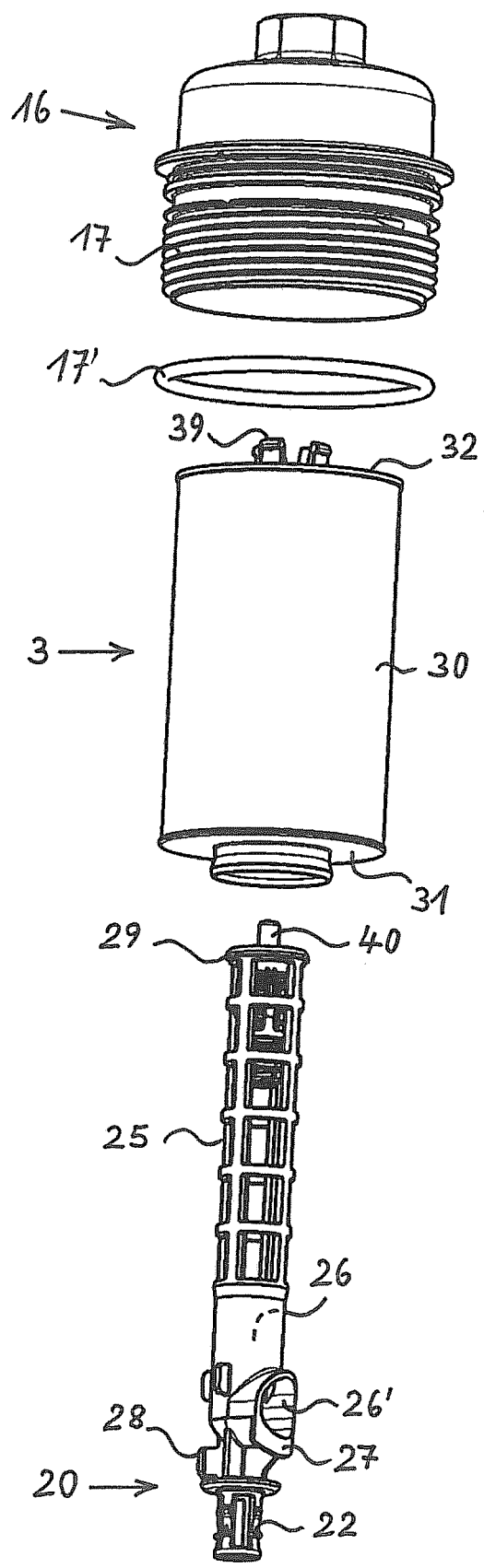
FIG. 17 shows an assembly unit consisting of valve body, filter insert, seal and cover of the filter housing of the liquid filter in an exploded view.

FIG. 17 shows in an exploded view the parts of a preassembled unit consisting of the cover 16, the seal 17', the filter insert 3 and the valve body 20 including the standpipe 25. Here, the mentioned parts are detachably connected to each other via the already described latching connection means by joining said parts in the axial direction and pressing them together until the latching connection means snap into place.

Figure 18:
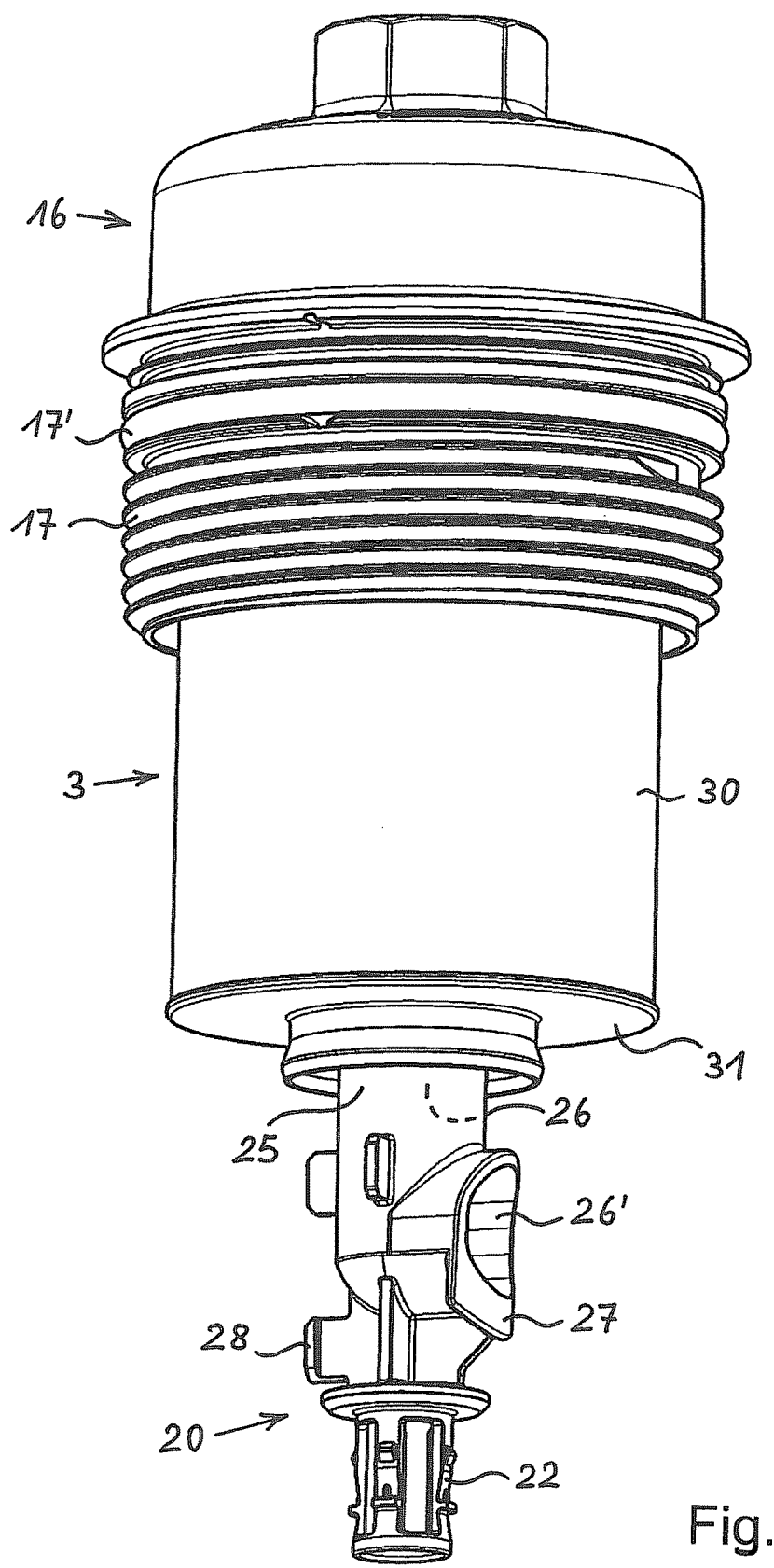
FIG. 18 shows the assembly unit assembled from parts according to FIG. 17, in an overall view.

The thus achieved state of the unit consisting of cover 16, seal 17', filter insert 3 and valve body 20 including standpipe 25 is shown in FIG. 18. This preassembled unit can be produced and assembled, for example, by a supplier and can then be delivered to a customer who then connects this unit to his filter housing by means of the screw connection 17 using a simple screwing process.

Figure 19:
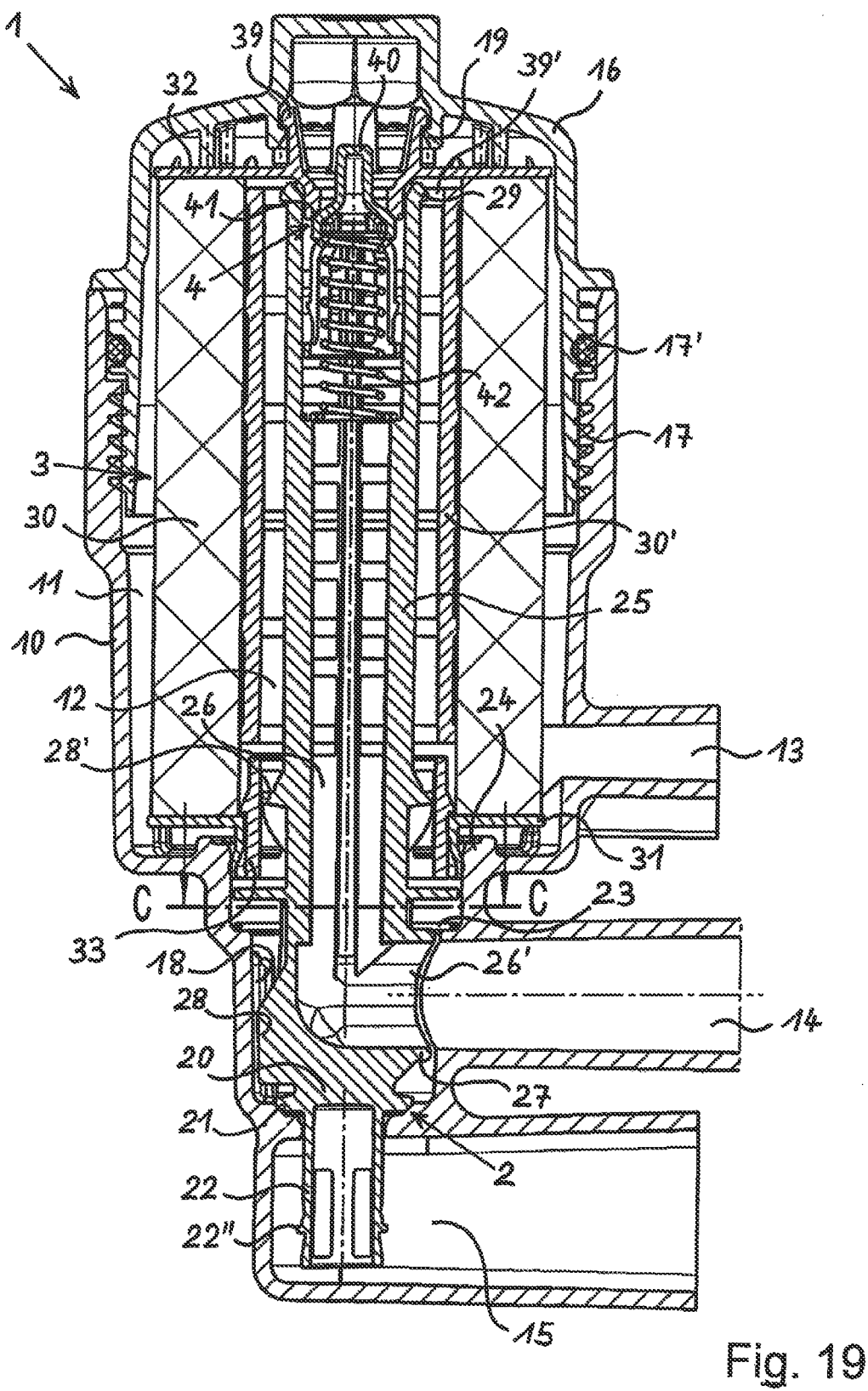
FIG. 19 shows the liquid filter in a second embodiment in a longitudinal section, in its assembled operating state.

FIG. 19 shows a second embodiment of the liquid filter 1, wherein this liquid filter likewise has a drainage valve 2 and a filter bypass valve 4. Many parts of the liquid filter 1 according to FIG. 19 correspond to the previously described liquid filter.

However, the configuration of the means holding the valve body 20 in the open position of the drainage valve 2 during filter maintenance is different. For this purpose, an annular spring 23 is provided here on the valve body 20 in the region of the valve body's transition to the standpipe 25, which annular spring surrounds the standpipe 25 in the lower end region thereof on the outside directly above the opening 26'. The annular spring 23 is configured such that its diameter in regions of the circumference can be changed between two different dimensions. In the state according to FIG. 19, the maximum diameter of the annular spring 23 is at a minimum so that the annular spring 23 fits into the filter housing's 10 lower portion, which forms an indentation having a cylindrical shape. This shape of the annular spring 23 is effected by a forming element 33 on the bottom side of the filter insert 3, which forming element interacts with the annular spring. In this position, the valve body 20 is sealingly attached to its valve seat 21 so that the drainage valve 2 is now closed and the liquid filter 1 is ready for operation.

Here too, the cover 16 is detachably connected to the filter insert 3 via latching means 19 and 39, and the filter insert 3 is detachably connected to the valve body 20 via the standpipe 25 thereof by means of the latching connection means 29 and 39'. As already described above in connection with the first exemplary embodiment of the liquid filter 1, the latching connection means serve for the purpose of being able to preassemble a unit consisting of cover 16, filter insert 3 and valve body 20 and to subsequently connect it to the housing 10. Moreover, when unscrewing the cover 16 during maintenance of the filter 1, here too, the filter insert 3 can be removed together with the cover 16 from the housing 10 and, at the same time, the valve body 20 can be transferred into its open position for opening the drainage valve 2.

Below the lower end plate 31 of the filter insert 3 in the filter housing 10, a spring element restraint 24 is formed which, in an open position of the valve body 20, interacts with the annular spring 23, as will be described below. With regard to the further reference numerals in FIG. 19, reference is made to the preceding description.

Figure 20:
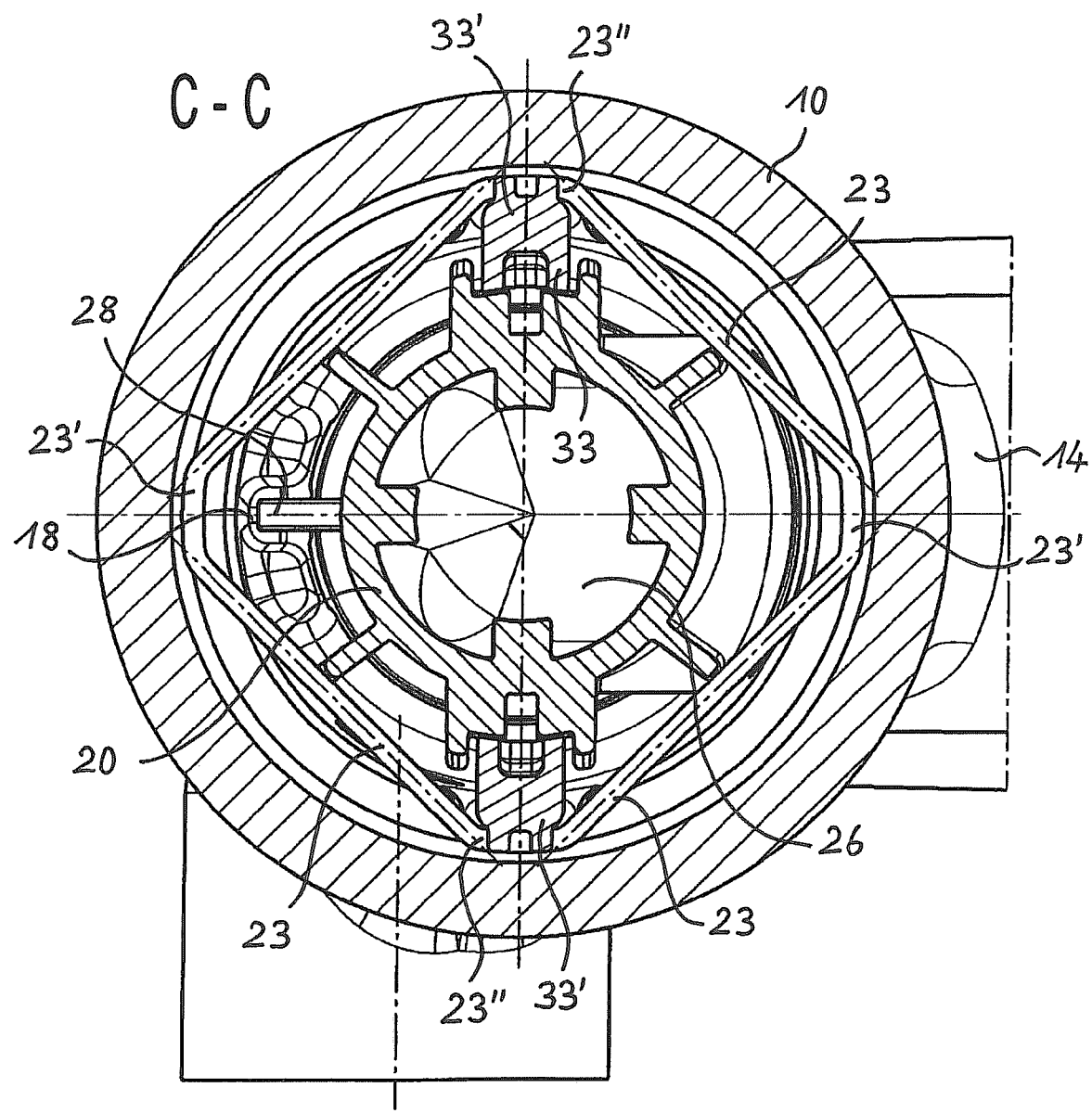
FIG. 20 shows a section according to the line C-C in FIG. 19.

FIG. 20 shows a section according to the line C-C in FIG. 19, wherein the sectional plane extends directly above the annular spring 23. The rhombic contour of the annular spring 23 is particularly clearly shown in FIG. 20. The annular spring 23 has two first outer rhombus corners 23 opposite from each other, and two second inner rhombus corners 23", likewise opposite from each other. The two inner rhombus corners 23" are engaged here with the forming element 33, more precisely, with the two arms 33' thereof, which, by axially displacing the forming element 33 from top downwards, have come into expanding engagement from the inside with the rhombus corners 23". By expanding the annular spring 23 at its rhombus corners 23", the distance between the two first rhombus corners 23' decreases at the same time so that the annular spring 23 overall obtains an approximately square shape, which allows inserting the annular spring 23 together with the valve body 20 downwards into the region of the filter housing 10 that accommodates the valve body 20 and the annular spring 23.

In the center of the valve body 20 runs the clean liquid channel 26, which leads into the clean liquid outlet 14 which is only partially visible here from outside on the outside of the housing 10.

On the left in FIG. 20, the interacting positioning means 18 and 20 are visible.

Figure 21:
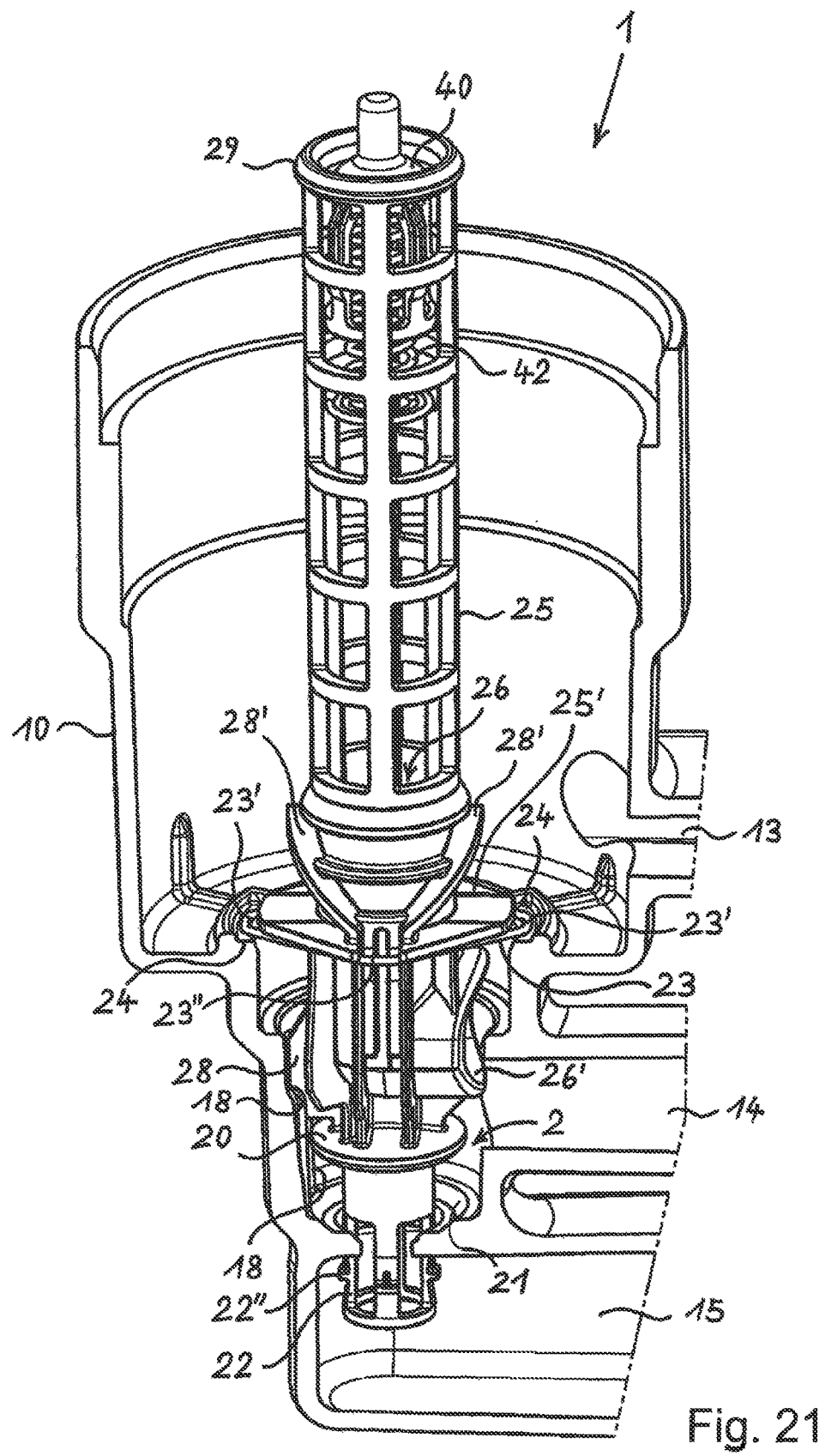
FIG. 21 shows the liquid filter from FIG. 19 in a cut-open view, with cover and filter insert removed during filter maintenance.

FIG. 21 shows the liquid filter 1 in a cut-open illustration in a state during its maintenance in which the cover 16 and the filter insert 3 are removed. As already described above, when unscrewing the cover 16, the filter insert 3 and the valve body 20 are carried along towards the top. As soon as the projections 22" abut at the spring arms 22 of the valve body 20 against the bottom side of the valve seat 21, the valve body 20 with the standpipe 25 cannot move further up, and the valve body 20 with the standpipe 25 detaches from the filter insert 3, while the connection between the filter insert 3 and the cover 16 still remains in place. For this purpose, the holding forces of the latching connections are configured differently.

In the first phase of unscrewing the cover 16, the valve body 20 moves into a position that is raised relative to the filter housing 10 until the annular spring 23 is above the spring element restraint 24 and the projections 22" rest against the valve seat 21. During a further upward movement of the cover 16 together with the filter insert 3, the forming element 33 with its arms 33' disengages from the inner rhombus corner 23" of the annular spring 23, whereupon the annular spring relaxes and deforms such that the outer rhombus corners 23' move outwards while the inner rhombus corners 23" move inwards. Hereby, the diameter of the annular spring 23, measured across the outer rhombus corners 23', increases, and after the valve body 20 with its standpipe 25 is detached from the filter insert 3, the annular spring 23 can lay down on the spring element restraint 24. In this manner, the annular spring 23 holds the valve body 20 with standpipe 25 in the raised position illustrated in FIG. 21, in which the drainage valve 2 is open and is kept open. Liquid contained in the housing 10 can now drain through the open drainage valve 2 and the liquid drainage channel 15.

The positioning means 18 and 28, which provide that the opening 26" is associated with the clean liquid channel 14, remain engaged with each other even in the open position of the drainage valve 2.

In order to guide, viewed in the circumferential direction, the arms 33' of the forming element 33, which is connected to or integrally formed with the filter insert 3, to the annular spring 23 for proper engagement therewith when attaching the filter insert 3 onto the standpipe 25, further positioning means 28' are provided on the outer circumference of the standpipe 25, which further positioning means have the shape here of a total of four coil portions which are arranged symmetrically to each other and converge in each case in pairs diagonally downwards. When attaching the filter insert 3 onto the standpipe 25, the arms 33' of the forming element 33, viewed in the circumferential direction, can come into contact with the positioning means 28' in any position, but during a further downward movement, they are then forcibly guided into the position ready for engagement to the inner rhombus corners 23" of the annular spring 23.

At the upper end of the standpipe 25, the latching connection means 29 thereof is visible. Inside the upper end region of the standpipe 25, the valve body 40 of the filter bypass valve 4 is guided. Therebelow, the compression spring 42 is arranged. Since here the cover of the housing 10 is removed, the spring 42 is relaxed and does not exert any force on the valve body 40 of the filter bypass valve 4 or on the valve body 20 of the drainage valve 2.

Figure 22:
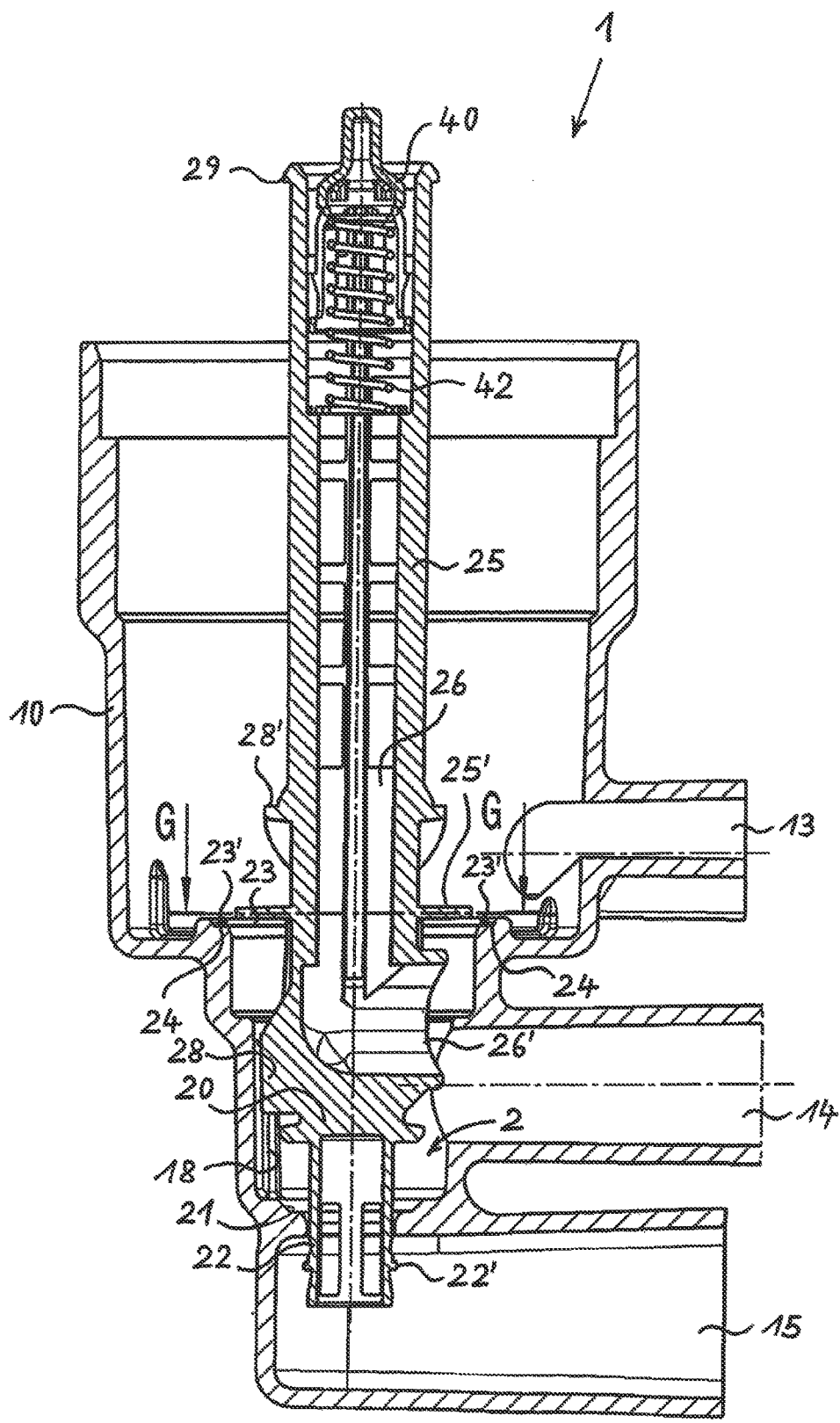
FIG. 22 shows the liquid filter from FIG. 21 in a longitudinal section.

FIG. 22 shows the liquid filter 1 in the state according to FIG. 21, now in a longitudinal section. The drainage valve 2 is open since the valve body 20 is now spaced apart from its valve seat 21. The annular spring 23 rests with its outer rhombus corners 23' on the spring element restraint 24 and thus holds the valve body 20 with the standpipe 25 in the raised position illustrated in FIG. 22. Thus, the drainage valve 2 is also kept open.

Figure 23:
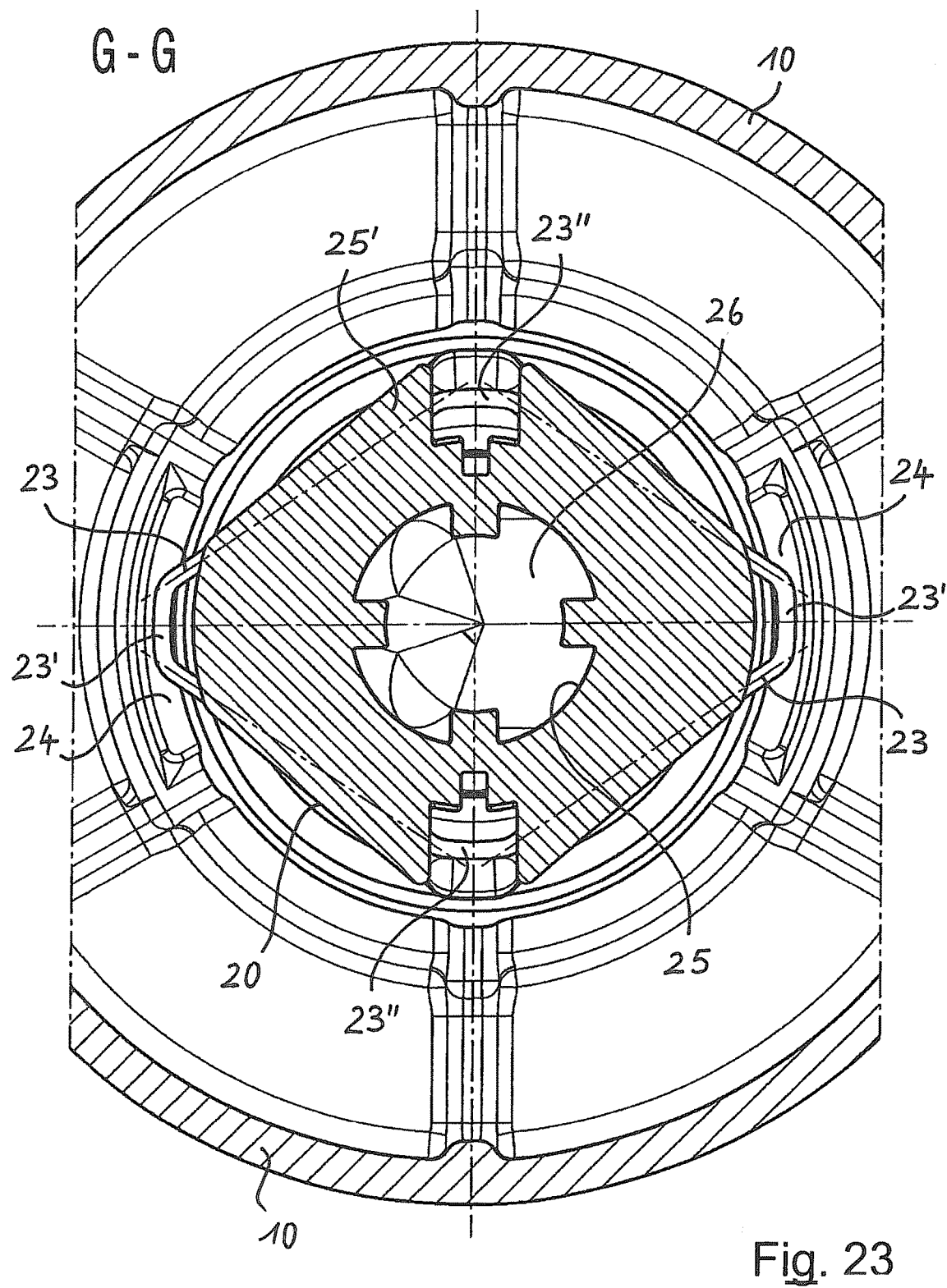
FIG. 23 shows a section according to the line G-G in FIG. 22.

FIG. 23 shows a section according to the line G-G in FIG. 22, wherein the view is directed to the annular spring 23 and a spring guiding collar 25' supporting and guiding said annular spring. Here, the annular spring 23 is relaxed since it is disengaged from the forming element 33. As a result, the outer rhombus corners 23' are in a position displaced radially outwards, in which position the rhombus corners rest on the spring element restraint 24. A downward movement of the valve body 20 in the closing direction of the drainage valve 2 is prevented here.

Figure 24:
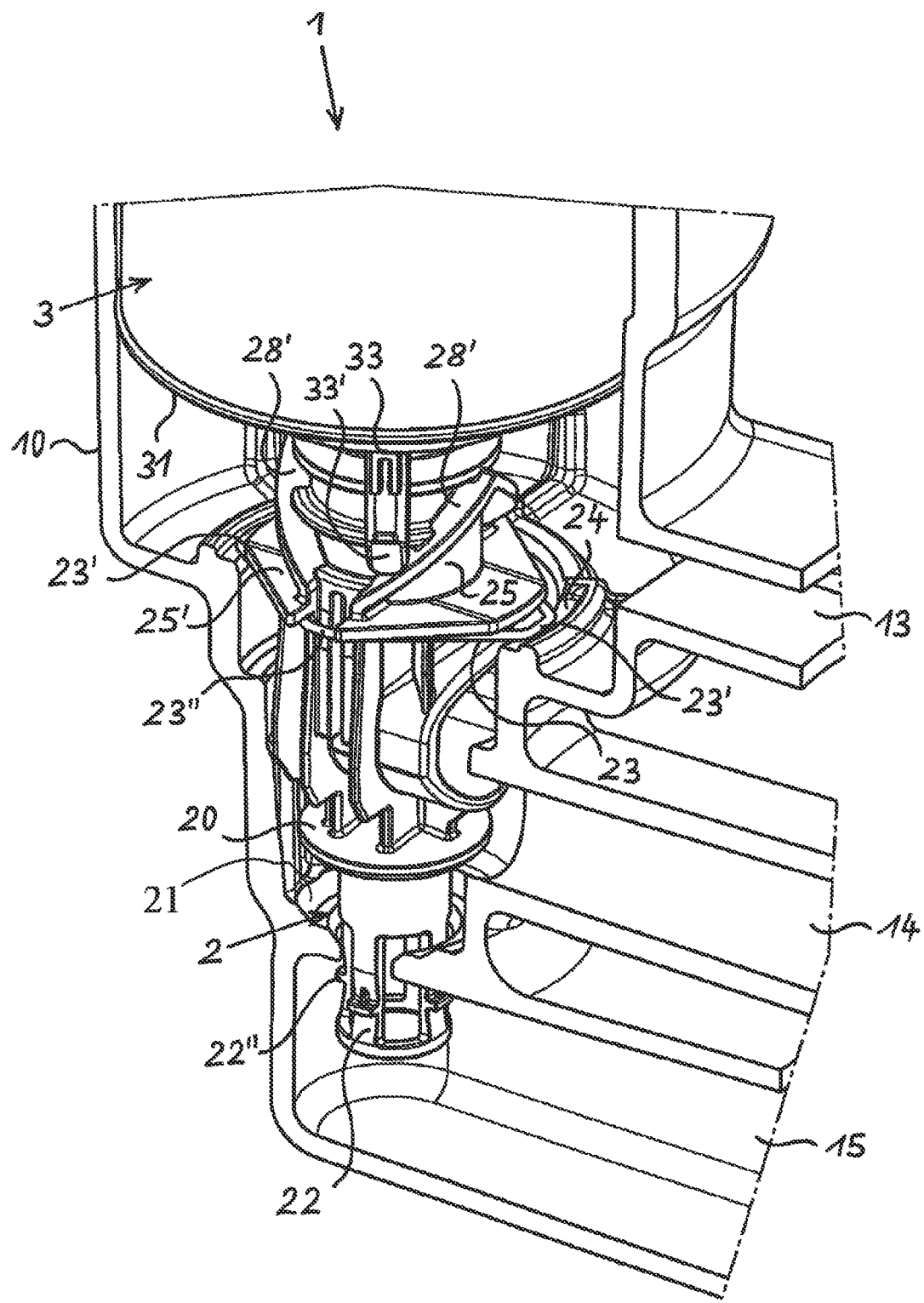
FIG. 24 shows the liquid filter from FIG. 19 in a cut-open view during a first phase of inserting a filter insert.

FIG. 24 shows in a cut-open view the liquid filter 1 during a first phase of insertion of a filter element 3 into the filter housing 10. At the bottom side of the lower end plate 31, the forming element 33 with its axially protruding arms 33' is arranged, which arms are already sliding here on the coil-shaped positioning means 28'. The annular spring 23 still is in its relaxed position in which the outer rhombus corners 23' rest on the spring element restraint 24.

Figure 25:
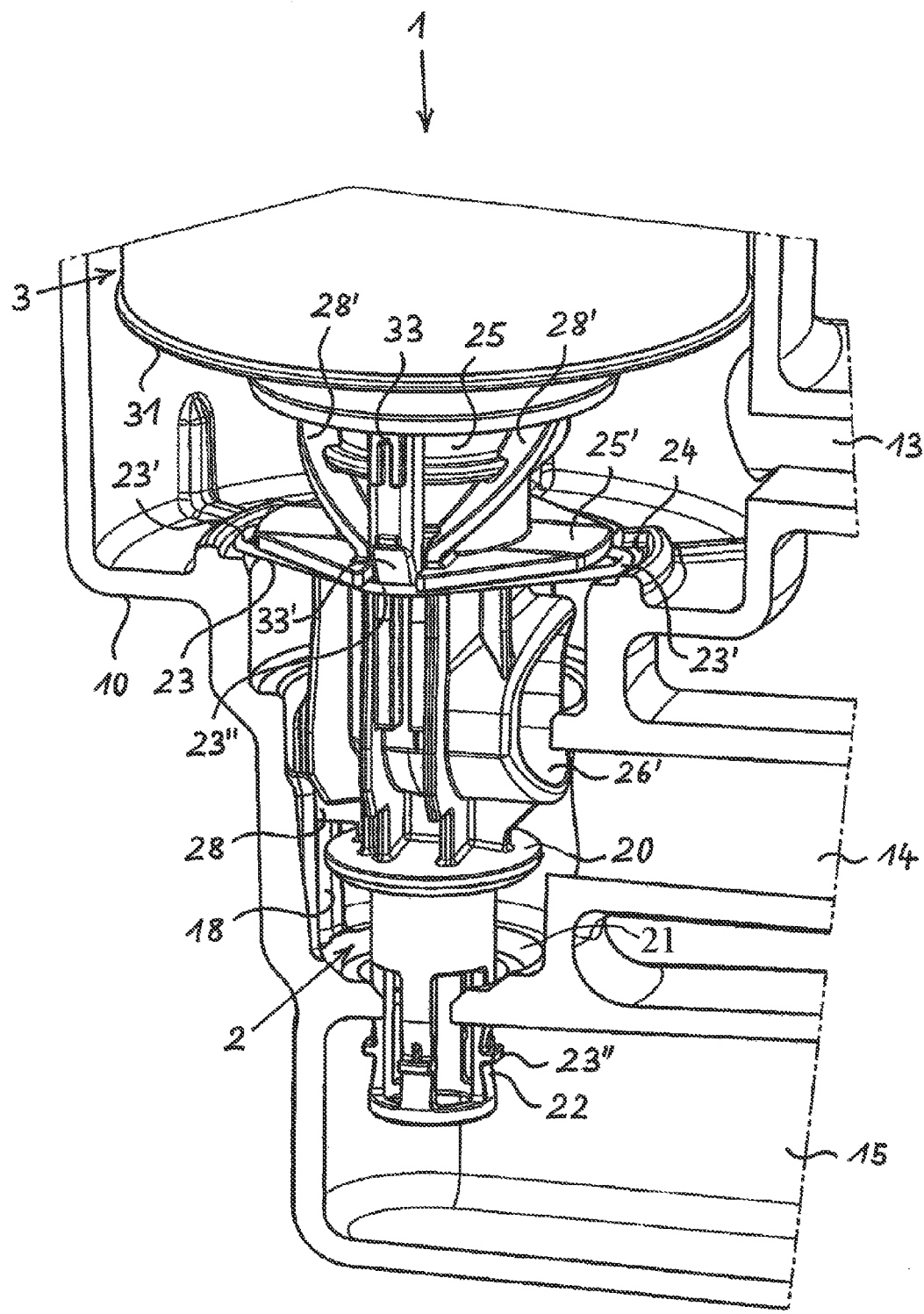
FIG. 25 shows the liquid filter in the same illustration as in FIG. 24, during a second phase of inserting the filter insert.

In FIG. 25, the filter insert is already moved further down, wherein the arms 33' of the forming element 33 have now reached their position ready for engagement at the inner rhombus corners 23" of the annular spring 23, but are not engaged yet with the annular spring 23. Thus, the outer rhombus corners 23' of the annular spring 23 still rest on the spring element restraint 24.

Figure 26:
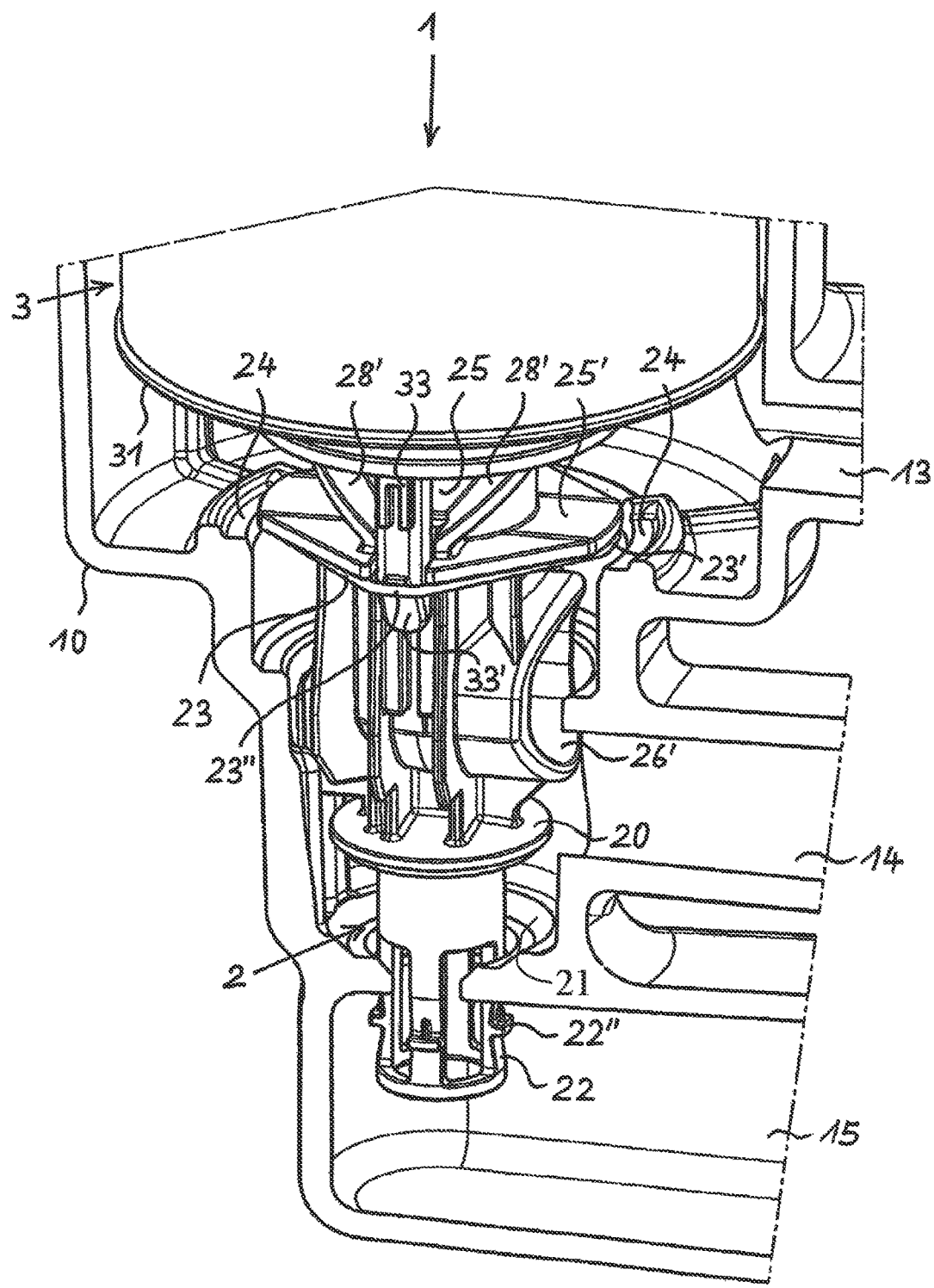
FIG. 26 shows the liquid filter in the same illustration as in the FIGS. 24 and 25, during a third phase of inserting the filter insert.

In FIG. 26, the filter insert 3, the forming element 33 and the arms 33' thereof are moved further down so that the arms 33' are now engaged with the inner rhombus corners 23" of the annular spring 23. Hereby, the annular spring 23 is widened at its rhombus corners 23" which results in that the distance between the two other rhombus corners 23' of the annular spring 23 decreases to such an extent that the outer rhombus corners 23' no longer rest on the spring element restraint 24. Due to this deformation of the annular spring 23, the holding function thereof for the valve body 20 is no longer in force, and the valve body 20 together with the filter insert 3 and optionally with the top-side cover can now be slid further down until the valve body 20 comes into sealing attachment to its valve seat 21. In this position, the drainage valve 2 is closed again and the opening 26' is in complete alignment again with the clean liquid outlet 14.

Figure 27:
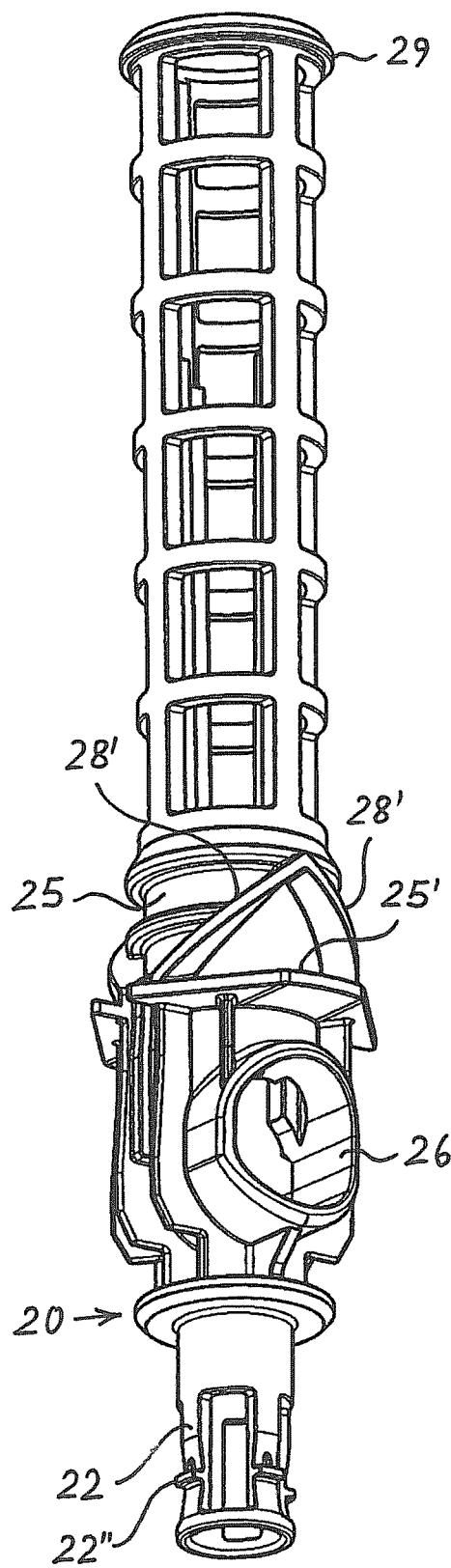
FIG. 27 shows a valve body of the liquid filter according to FIG. 19 in a first view.
Figure 28:
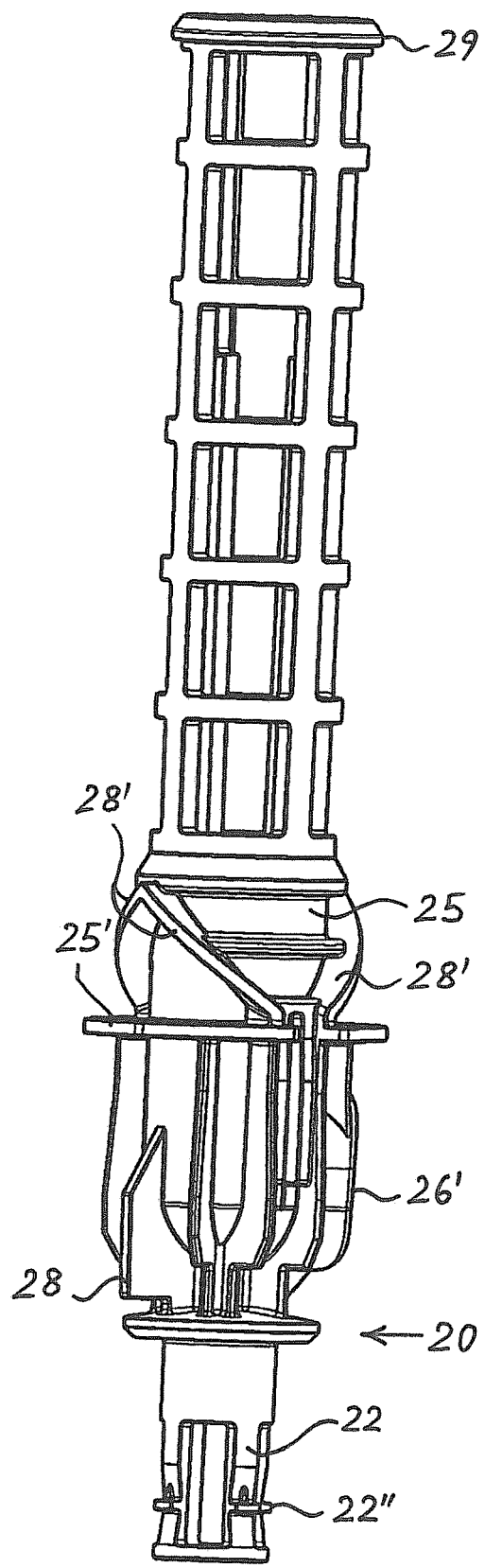
FIG. 28 shows the valve body from FIG. 27 in a second, rotated view.

In the FIGS. 27 and 28, the valve body 20 of the example of the liquid filter 1 described last is illustrated in two different views. The spring arms 23, which carry here only the barb-shaped projections 22" but no holding cams, extend from the valve body 20 in the downward direction. The function of the holding cams is assumed here by the associated annular spring 23 which, in the FIGS. 27 and 28, is not attached yet to the valve body 20. Above the valve body 20, there is the opening 26. Above said opening, there is the spring guiding collar 25', above which, in turn, the ramp-shaped positioning means 28' are formed on the outer circumference of the standpipe 25. FIG. 28 also shows the positioning means 28 in the form of the radially protruding tongue, which is located opposite from the opening 26'. At the very top at the standpipe 25, the latching connection means 29 thereof is visible. In accordance with the preceding exemplary embodiment, the standpipe 25 is closed only in its lower region, whereas it is grid-shaped in its larger upper part so as to allow a low-resistance inflow of filtered liquid. Advantageously, the entire valve body 20 including the standpipe 25 with all elements formed thereon can be produced in one piece as an injection molded part from plastic.

Figure 29:
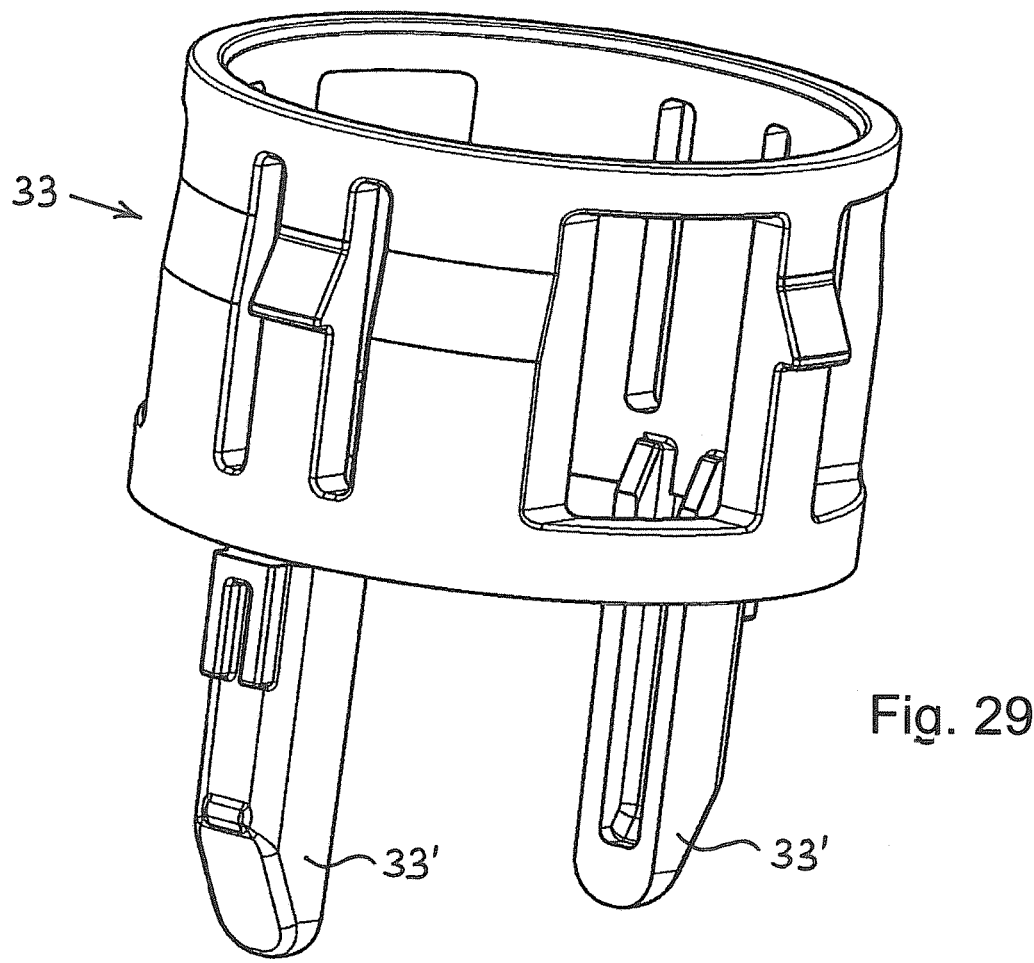
FIG. 29 shows a forming element as individual part of the liquid filter according to FIG. 19 in a perspective view.

FIG. 29 shows the forming element 33 as an individual part which has a hollow-cylindrical, partially cut-open base body which is provided with latching elements and can be latched in place on the bottom side of the filter insert 3. The two axial arms 33' for deforming the annular spring 23 which are arranged opposite from one another in the circumferential direction extend from the base body in the downward direction.

Figure 30:
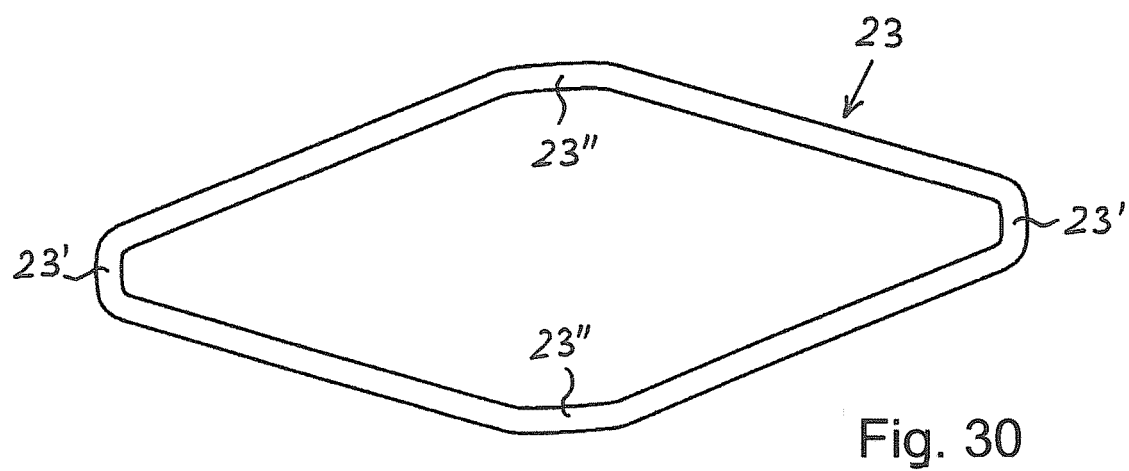
FIG. 30 shows an annular spring as an individual part of the liquid filter according to FIG. 19, in a top view.

In FIG. 30, the annular spring 23 is illustrated in a top view diagonally from above, wherein here the rhombic shape of the annular spring 23 is clearly visible. Since there is no engagement here with the forming element 33, the annular spring 23 is relaxed, by which means the distance between the two outer rhombus corners 23' is greater than the distance between the two inner rhombus corners 23". The annular spring 23 adopts this relaxed state when it keeps the valve body 20 including the standpipe 25 in the open position of the drainage valve 2, in which open position the outer rhombus corners 23' rest on the spring element restraint 24.

Figure 31:
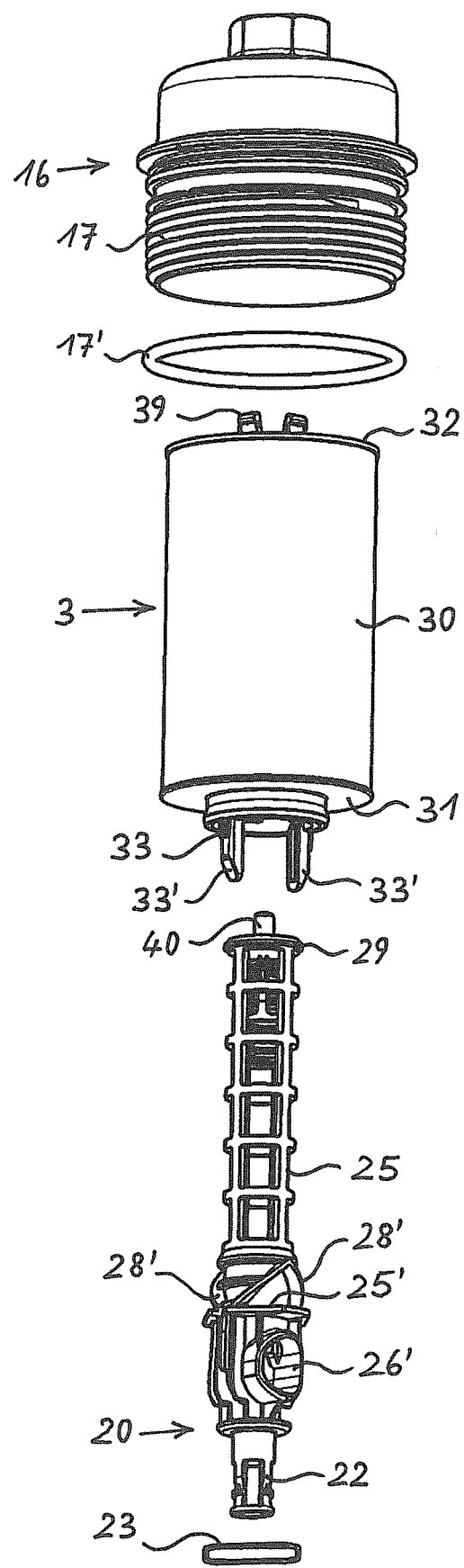
FIG. 31 shows an assembly unit consisting of annular spring, valve body, forming element, filter insert, seal and cover in an exploded view.

FIG. 31 shows in the same kind of illustration as FIG. 17 an exploded view of a unit that can be preassembled. This unit comprises the cover 16, the seal 17', the filter insert 3 with the forming element 33, the valve body 20 including the standpipe 25, and the annular spring 23. For preassembling these parts so as to form the preassembled unit, it is sufficient to join the parts in the axial direction and to press them together until the latching connection means 39 latch in place between the parts involved, wherein here only the latching connection means 39 at the upper end plate 32 of the filter insert 3 and the latching connection means 29 at the upper end of the standpipe 25 of the valve body 20 are visible. The annular spring 23 is retained on the valve body 20 by clamping directly below the spring guiding collar 25'.

Figure 32:
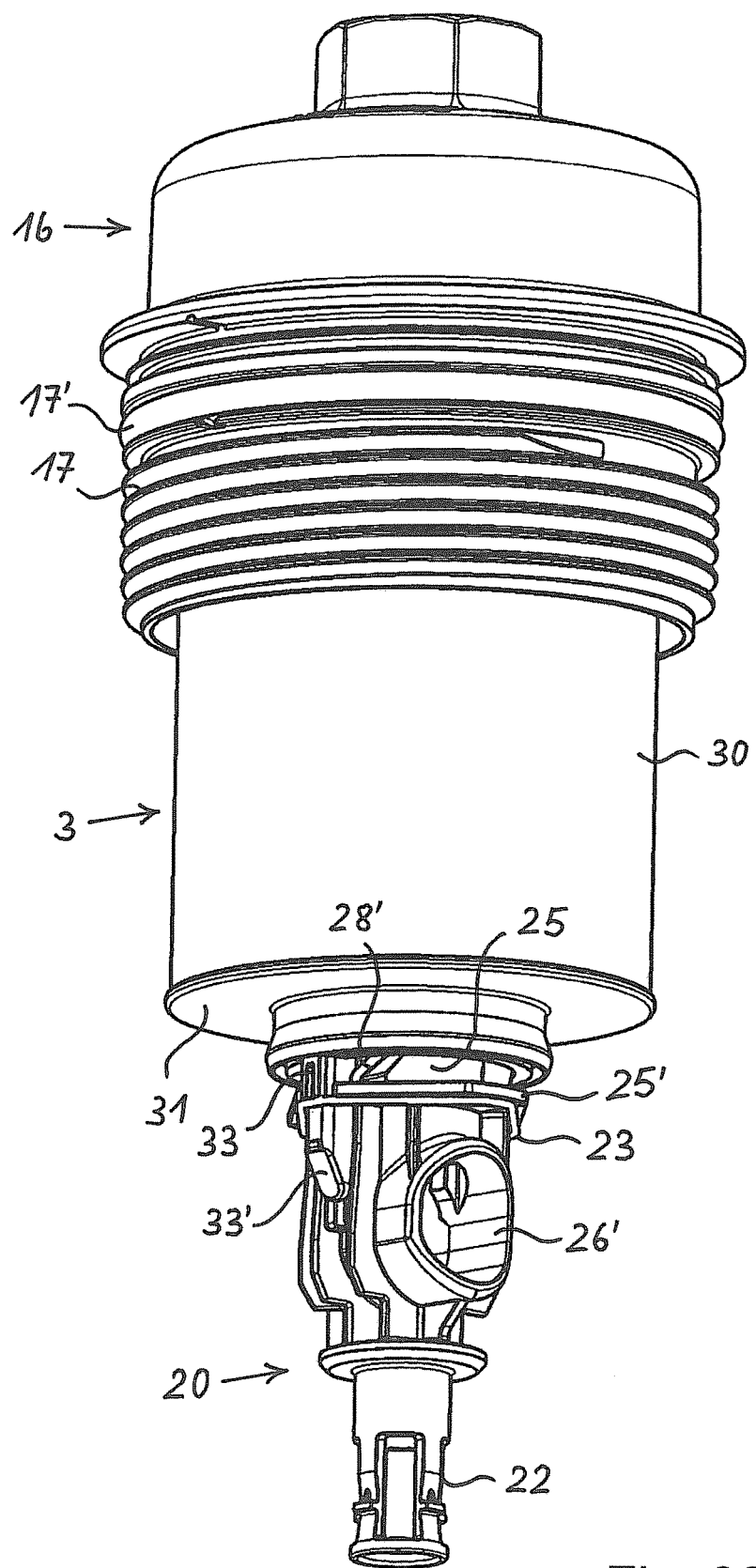
FIG. 32 shows the assembly unit consisting of the parts according to FIG. 31 in the assembled state.

In FIG. 32, the preassembled unit is completely fitted together, wherein now the previously mentioned individual components are detachably connected to each other. This preassembled unit can be connected as a whole to the filter housing 10 by inserting the unit, with the valve body 20 leading, in the axial direction into the housing 10 and subsequently screwing the cover 16 via the screw connection 17 to the filter housing 10.

Figure 33:
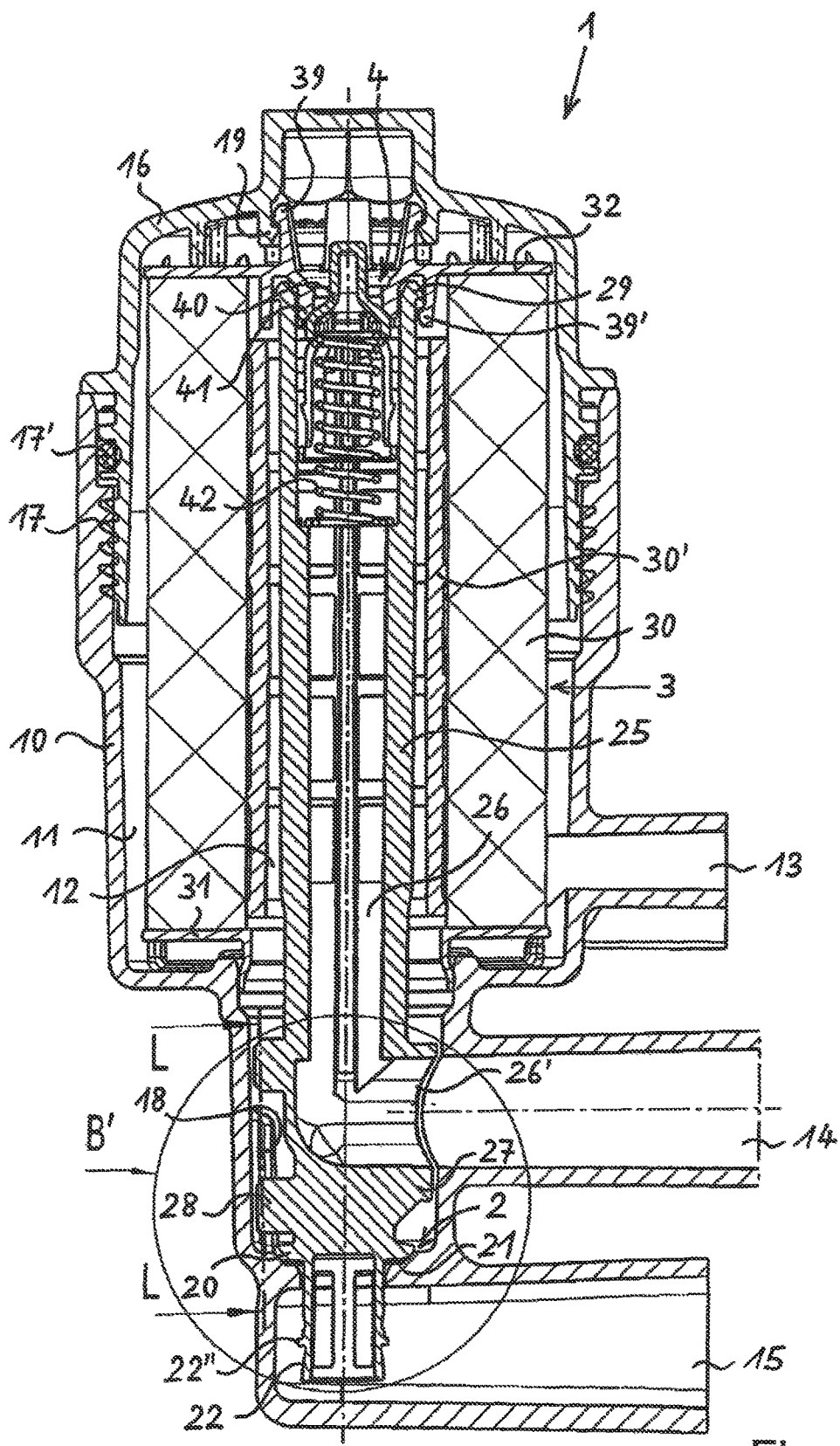
FIG. 33 shows the liquid filter in a third embodiment in a longitudinal section, in its assembled operating state.

In FIG. 33, a third exemplary embodiment of the liquid filter 1 is illustrated, which corresponds as far as possible to the first exemplary embodiment according to the FIGS. 1 to 18, so that reference is made to the description of said Figures.

The difference with regard to the example according to FIG. 33 is that here each of the spring arms 22 extending axially downward from the valve body 20 has only a barb-shaped projection 22", but no holding cam. Also, an annular spring as a retaining element is not provided here. Thus, in this example of the liquid filter 1, the drainage valve 2 is open during maintenance, when the cover 16 and the filter insert 3 are removed, only as long as the valve body 20 remains via the standpipe 27 in latching engagement with the filter insert 3. Upon abutting of the projections 22" against the bottom side of the valve seat 21, the valve body 20 detaches from the filter insert 3 and falls downwards driven by gravity. Since here the drainage valve 2 is not kept open when the filter insert 3 is removed from the filter housing 10, the liquid filter 1 according to FIG. 33 is suitable in particular for liquids having low viscosity, which drain very quickly from the filter housing 10.

Also, in the example according to FIG. 33, a filter bypass valve 4 is provided again in addition to the drainage valve 2, wherein the embodiment of said filter bypass valve corresponds to the example already described above. The compression spring 42 is supported at its upper end on the valve body 40 of the filter bypass valve 4, and at its lower end, it is supported on a step in the standpipe 25 and thus on the valve body 20. Thus, a single common compression spring generates the preloading forces acting in the closing direction of the two valves 2 and 4 when the filter insert 3 is inserted and the cover 16 is attached. The pressure of the compression spring 42 is generated in that during the mounting of the cover 16, the valve seat 41 in the upper end plate 31 presses against the valve body 40 and moves the latter downwards in the axial direction by a certain distance.

Figure 34:
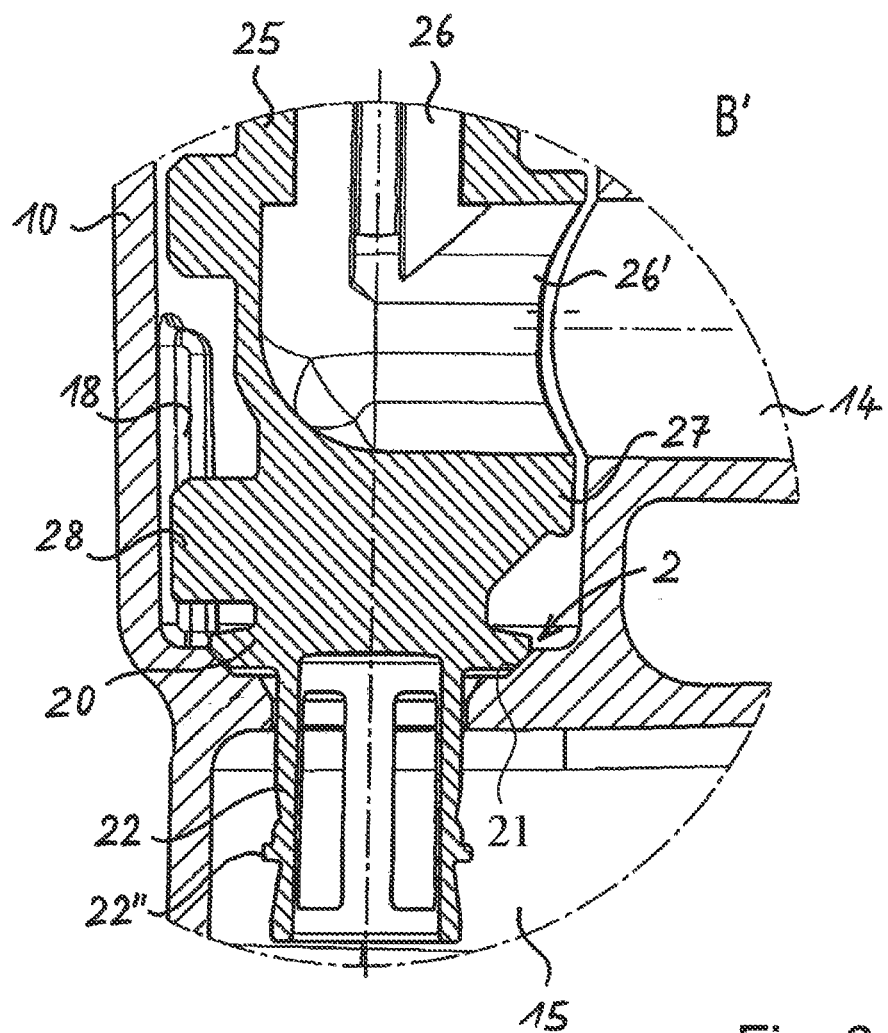
FIG. 34 shows the detail B' encircled in FIG. 33 in an enlarged illustration.

Finally, FIG. 34 shows the detail B' encircled in FIG. 33 in an enlarged illustration. The valve body 20 of the drainage valve 2 is sealingly attached to its valve seat 21. The positioning means 18 and 28 are in engagement with each other in order to bring the opening 26' of the clean liquid channel 26 in the standpipe 25 in exact alignment with the clean liquid outlet 14 running in the radial direction and to keep it in alignment. The spring arms 23 with the respective projection 22" protrude through the valve seat 21 into the liquid drainage channel 15.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

| Reference list | |
| --- | --- |
| Numeral | Designation |
| 1 | Liquid filter |
| 10 | Filter housing |
| 11 | Dirty side |
| 12 | Clean side |
| 13 | Dirty liquid feed |
| 14 | Clean liquid outlet |
| 15 | Liquid drainage channel |
| 16 | Cover |
| 17 | Screw connection between 10 and 16 |
| 17' | Seal |
| 18 | Positioning means in 15 |
| 19 | Latching connection means on 16 |
| 2 | Drainage valve |
| 20 | Valve body |
| 21 | Valve seat/restriction |
| 22 | Spring tongues |
| 22' | Holding cams |
| 22" | Barb-shaped projection |
| 23 | Annular spring |
| 23' | Outer rhombus corners |
| 23" | Inner rhombus corners |
| 24 | Spring element restraint |
| 25 | Standpipe |
| 25' | Spring guiding collar |
| 26 | Clean liquid channel in 25 |
| 26' | Opening of 26 |
| 27 | Collar on 20 below 26' |
| 28, 28' | Positioning means on 20, on 25 |
| 29 | Latching connection means on 20 |
| 3 | Filter insert |
| 30 | Filter cloth body |
| 30' | Support grid in 30 |
| 31 | Lower end plate |
| 32 | Upper end plate |

| Reference list -continued | |
| --- | --- |
| Numeral | Designation |
| 33 | Forming element |
| 33' | Arms of 33 |
| 39, 39' | Latching connection means on 3 to 19, to 29 |
| 4 | Filter bypass valve |
| 40 | Valve body of 4 |
| 41 | Valve seat of 4 |
| 42 | Compression spring |

The invention claimed is:

1. A liquid filter comprising:
a filter housing arranged upright in operation, and
a hollow-cylindrical filter insert accommodated therein so as to be exchangeable,
the filter housing having a dirty liquid feed, a clean liquid outlet and a liquid drainage channel, and being closed in operation by means of a detachable top-side cover,
a drainage valve being arranged in the drainage channel, the valve body of which is displaceable in an axially limited manner in the drainage channel between a closing position closing the channel and an open position clearing it,
the valve body being detachably attached to one of the cover and the filter insert,
wherein, when the cover is mounted on the filter housing, said cover presses the valve body one of directly and via the filter insert into the closing position closing the drainage channel, and
wherein, when the cover is removed from the filter housing in the axial direction thereof, the valve body is first able to be carried along by the cover or by the filter insert in the opening direction to its open position, and then is detachable from the one of the cover and the filter insert and is retainable in its open position by means of a holding element,
the holding element being formed by at least one spring element which automatically expands into the opening position of the valve body by its spring force, and comes into attachment to a spring element restraint holding the valve body in its open position, and which by exertion of a force contracts, and thus a displacement of the valve body in the closing direction is brought about, releasing engagement with the spring element restraint.

2. The liquid filter according to claim 1, wherein the force that contracts the at least one spring element is generated by exerting an axial thrust force onto one of the filter insert and the valve body in the closing direction thereof.

3. The liquid filter according to claim 1, wherein the spring element is one of part of the valve body and being connected thereto, and wherein the spring element restraint as one of a part of the filter housing and as a part connected to the filter housing, is arranged in the drainage channel.

4. The liquid filter according to claim 1, wherein the spring element is formed by one or more spring tongues which extend in the axial direction of the valve body from the lower end thereof and which has on an outside of the spring element at least in each case one holding cam, and wherein the spring element restraint is formed by the upper side of a ring-shaped restriction of the drainage channel through which the spring tongues extend.

5. The liquid filter according to claim 4, wherein the ring-shaped restriction of the drainage channel also forms the valve seat of the drainage valve.

6. The liquid filter according to claim 4, wherein at an axial distance from the holding cams, the one or more spring tongues each have on their outside another barb-shaped projection located towards their free ends, wherein the axial movement path of the valve body in the opening direction is limited by the projections abutting against the lower side of the ring-shaped restriction.

7. The liquid filter according to claim 1, wherein the spring element is formed by an annular spring which is arranged in a plane transverse to the axial direction of the valve body and can be deformed in this plane, wherein in the open position of the valve body, the annular spring is unloaded and has its largest diameter and rests on the spring element restraint, and wherein by at least one forming element connected one of directly and indirectly to the cover and exerting a force on the annular spring, the diameter of the annular spring can be decreased when mounting the cover on the housing to such an extent that the annular spring becomes detached from the spring element restraint in the radially inward direction and, together with the valve body, is displaced in the drainage channel in the closing direction relative to the spring element restraint.

8. The liquid filter according to claim 7, wherein when viewed from above, the annular spring forming the spring element has a rhombic contour, wherein in the relaxed state, the annular spring rests with two outer rhombus corners, which oppose each other, on the spring element restraint, and wherein the forming element has two axially extending arms which, when mounting the cover on the housing, by expanding with the two other inner rhombus corners from inside towards the outside and thereby moving the two outer rhombus corners inwards, come into engagement with the annular spring.

9. The liquid filter according to claim 7, wherein the forming element is formed one of integrally with and fixedly connected to, one of the filter insert and the cover.

10. The liquid filter according to claim 7, wherein the valve body can have one or more spring tongues which extend in the axial direction of the valve body from the lower end thereof and each of which have one barb-shaped projection on the outside, wherein the axial movement path of the valve body in the opening direction is limited by the projections abutting against the lower side of a ring-shaped restriction in the drainage channel.

11. The liquid filter according to claim 1, wherein in an upper portion extending towards the cover, the valve body is configured as a standpipe onto which the filter insert is attached, and wherein the interior of the standpipe forms a clean liquid channel which runs to the clean liquid outlet and the lower channel end of which has an opening which faces in the radial direction and to which is connected a portion of the clean liquid outlet that likewise extends in the radial direction.

12. The liquid filter according to claim 11, wherein on an outer circumference of the valve body and on an inner circumference of the drainage channel positioning means are arranged which, when inserting the valve body into the drainage channel, forcibly guide the valve body, viewed in the circumferential direction, into such a particular position relative to the drainage channel that the opening of the clean liquid channel comes into alignment with the subsequent portion of the clean liquid outlet.

13. The liquid filter according to claim 11, wherein on an outer circumference of the valve body, below the opening of the clean liquid channel, a collar is one of attached and formed, which collar shields the clean liquid outlet when the valve body is in the open position.

14. The liquid filter according to claim 7, wherein in an upper portion extending towards the cover, the valve body is configured as a standpipe onto which the filter insert is attached,
the interior of the standpipe forms a clean liquid channel which runs to the clean liquid outlet and the lower channel end of which has an opening which faces in the radial direction and to which is connected a portion of the clean liquid outlet that likewise extends in the radial direction, and
positioning means are arranged on an outer circumference of the standpipe and on an inner circumference of the forming element or the filter insert, which positioning means, when attaching the filter insert onto the standpipe, forcibly guide the forming element, viewed in the circumferential direction, in such a position relative to the standpipe and to the annular spring that the arms of the forming element come into engagement with the inner rhombus corners of the annular spring.

15. The liquid filter according to claim 1, wherein in the liquid filter a bypass valve is arranged which has an axially displaceable valve body, the closing direction of which points towards the cover, and wherein a compression spring is arranged between the valve body of the drainage valve and the valve body of the filter bypass valve, which compression spring preloads both valve bodies at the same time in their respective closing direction when the cover is mounted on the filter housing.

16. The liquid filter according to claim 15, wherein the valve body of the filter bypass valve is guided in an upper end region of a standpipe, and the compression spring is arranged in the standpipe and is supported on one side on the standpipe, and on the other side, the compression spring is supported on the valve body of the filter bypass valve.

17. The liquid filter according to claim 1, wherein a first latching connection is provided between the cover and the filter insert, wherein a second latching connection is provided between the filter insert and the valve body of the drainage valve, and wherein the holding force of the first latching connection is higher than the holding force of the second latching connection.

18. The liquid filter according to claim 17, wherein the two latching connections are adapted to allow mutual rotating of the parts connected via said latching connections, and to transmit a limited torque at the same time.

19. A liquid filter comprising:
a filter housing arranged upright in operation, and
a hollow-cylindrical filter insert accommodated therein so as to be exchangeable,
the filter housing having a dirty liquid feed, a clean liquid outlet and a liquid drainage channel, and being closed in operation by means of a detachable top-side cover,
a drainage valve being arranged in the drainage channel,
a valve body of the drainage valve being displaceable in an axially limited manner in the drainage channel between a closing position closing the channel and an open position clearing it,
wherein when the cover is mounted on the filter housing, the valve body of the drainage valve is pressed against a valve seat and into the closing position closing the drainage channel, wherein the valve seat for the valve body of the drainage valve comprises a restriction in the drainage channel, and wherein when removing the cover from the filter housing in the axial direction thereof, the valve body of the drainage valve is carried along in the opening direction by one of the cover and the filter insert, a filter bypass valve being arranged in the filter housing having an axially displaceable valve body, the closing direction of which points towards the cover, and a compression spring being arranged between the valve body of the drainage valve and the valve body of the filter bypass valve, which compression spring preloads both valve bodies at the same time in their respective closing direction when the cover is mounted on the housing.

20. The liquid filter according to claim 19, wherein the valve body of the drainage valve is detachably connected to one of the cover and the filter insert.

21. The liquid filter according to claim 20, wherein when removing one of the cover and the filter insert from the filter housing in the axial direction thereof, the valve body of the drainage valve is first carried along by the one of the cover and the filter insert in the opening direction up to its open position and then is automatically detached from the one of the cover and the filter insert.

22. The liquid filter according to claim 21, wherein after the valve body of the drainage valve is detached from the one of the cover and the filter insert, the valve body of the drainage valve is held in its open position by means of a holding element comprising a spring element in the form of one or more spring tongues which extend in the axial direction of the valve body of the drainage valve from the lower end thereof and which have in each case at least one holding cam on their outer side.

23. The liquid filter according to claim 19, wherein in an upper portion extending towards the cover, the valve body of the drainage valve is configured as a standpipe onto which the filter insert is attached, wherein the interior of the standpipe forms a clean liquid channel that runs to the clean liquid outlet, wherein the valve body of the filter bypass valve is guided in an upper end region of the standpipe, and wherein the compression spring is arranged in the standpipe and is supported on one side on the standpipe, and on the other side, the compression spring is supported on the valve body of the filter bypass valve.

* * * * *